United States Patent [19]
Drori

[11] Patent Number: 5,146,215
[45] Date of Patent: Sep. 8, 1992

[54] ELECTRONICALLY PROGRAMMABLE REMOTE CONTROL FOR VEHICLE SECURITY SYSTEM

[75] Inventor: Ze'ev Drori, Chatsworth, Calif.

[73] Assignee: Clifford Electronics, Inc., Chatsworth, Calif.

[21] Appl. No.: 277,959

[22] Filed: Nov. 30, 1988

Related U.S. Application Data

[63] Continuation-in-part of Ser. No. 94,395, Sep. 8, 1987, abandoned, and a continuation-in-part of Ser. No. 231,159, Aug. 11, 1988, Pat. No. 4,922,224.

[51] Int. Cl.⁵ .............................................. G06F 7/04
[52] U.S. Cl. ........................... 340/825.32; 340/825.31; 340/825.69; 340/825.72
[58] Field of Search ............... 340/825.31, 825.32, 340/825.69, 825.72, 528, 541, 543, 542; 70/278; 361/172; 307/10.2

[56] References Cited

U.S. PATENT DOCUMENTS

| | | | |
|---|---|---|---|
| 3,337,992 | 8/1967 | Tolson | 340/539 |
| 4,177,657 | 12/1979 | Aydin | 70/278 |
| 4,383,242 | 5/1983 | Sassover et al. | 340/64 |
| 4,535,333 | 8/1985 | Twardowski | 340/825.72 |
| 4,626,848 | 12/1986 | Ehlers | 340/825.72 |
| 4,652,860 | 3/1987 | Weishaupt et al. | 340/825.31 |
| 4,665,397 | 5/1987 | Pinnow | 340/825.72 |
| 4,754,255 | 6/1988 | Sanders et al. | 340/64 |
| 4,794,368 | 12/1988 | Grossheim et al. | 340/63 |

Primary Examiner—Ulysses Weldon
Attorney, Agent, or Firm—Roberts and Quiogue

[57] ABSTRACT

An electronically programmable remote control for an vehicle security system. The system remote control comprises one or more hand-held remote transmitters and a receiver unit located in the vehicle. The receiver is operable in conjunction with a control unit which contains a microprocessor capable of performing control functions and encoding functions. The remote control enables the user to electronically program into or delete from the receiver a digital code from any of a plurality of transmitters. It is not necessary for the user or anyone else to know the specific encoded signal which is transmitted from any of the transmitters to the receiver. The receiver is operable with a plurality of transmitters, all of which operate on the same frequency.

10 Claims, 21 Drawing Sheets

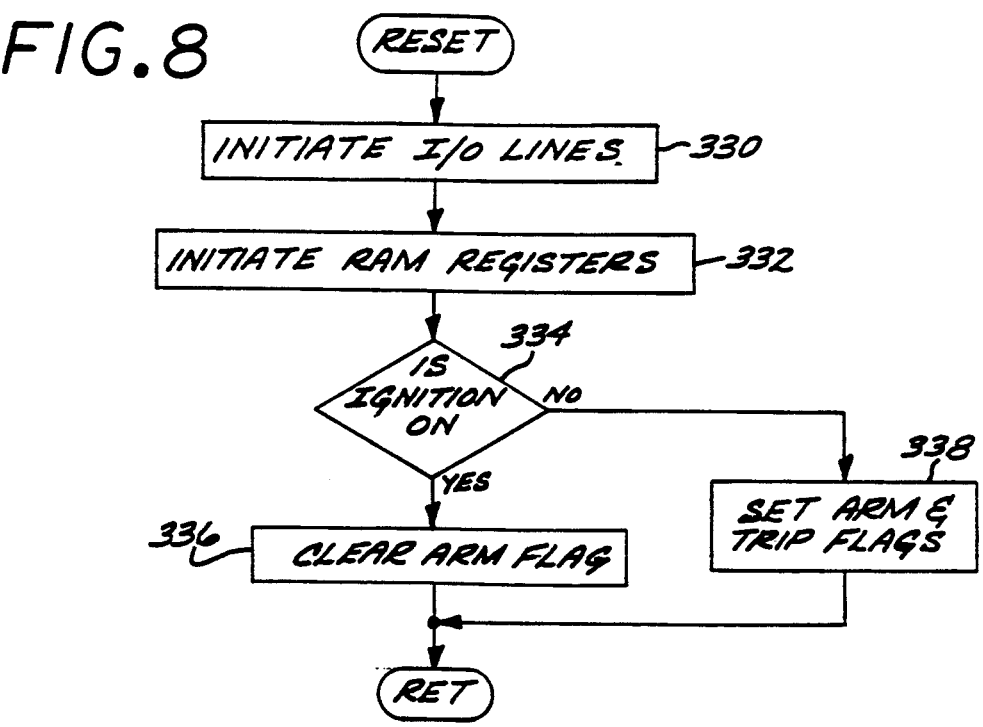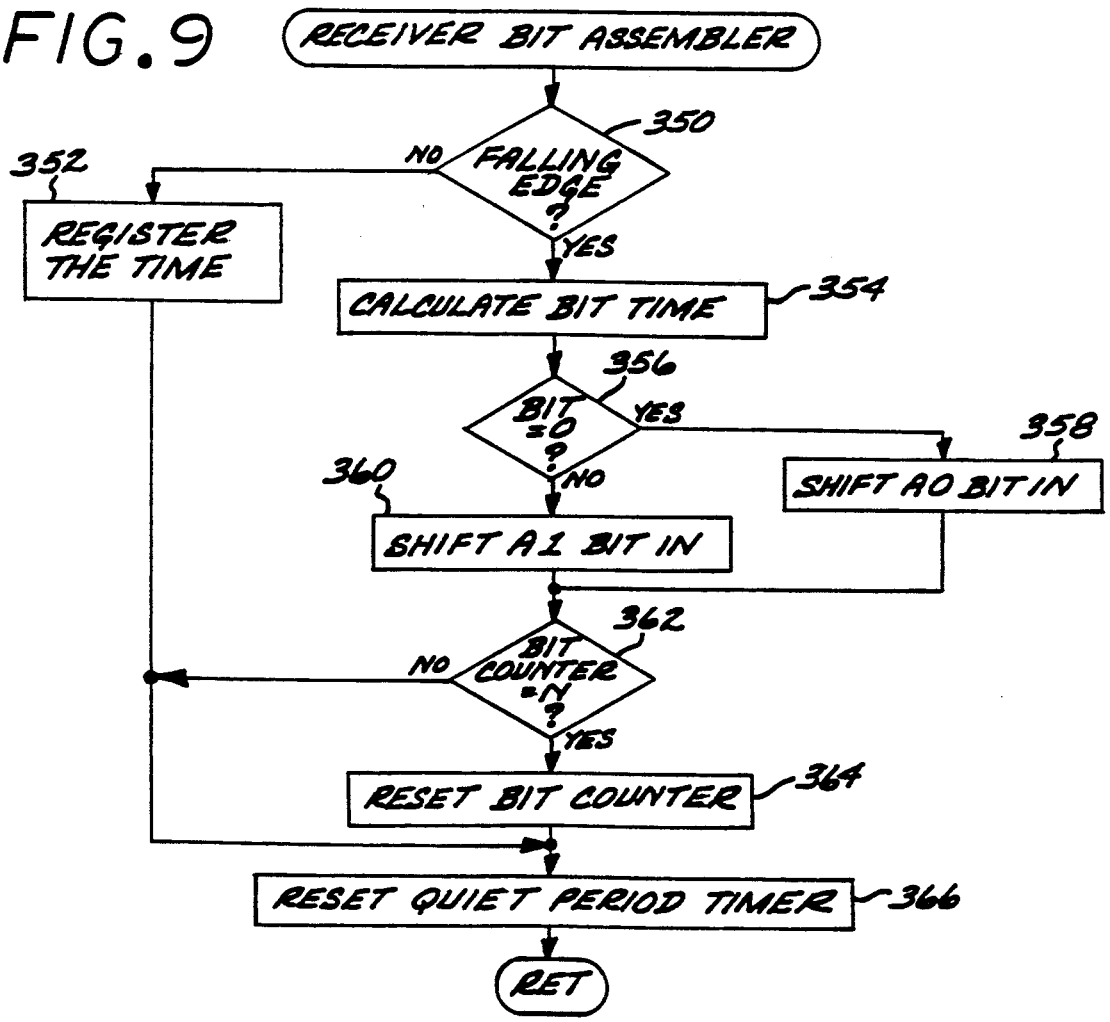

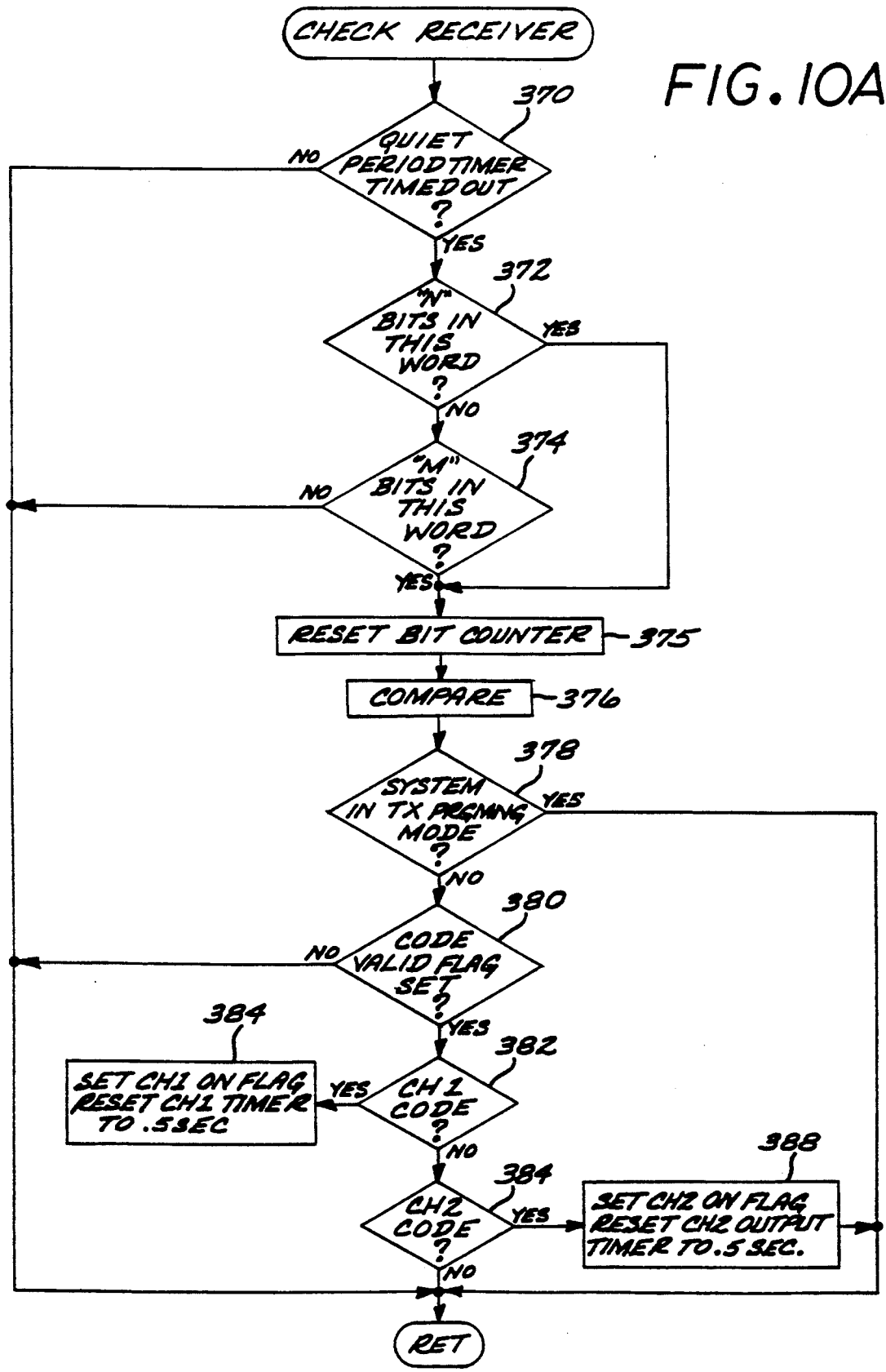

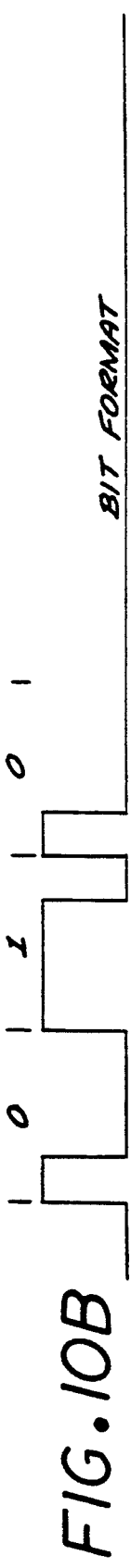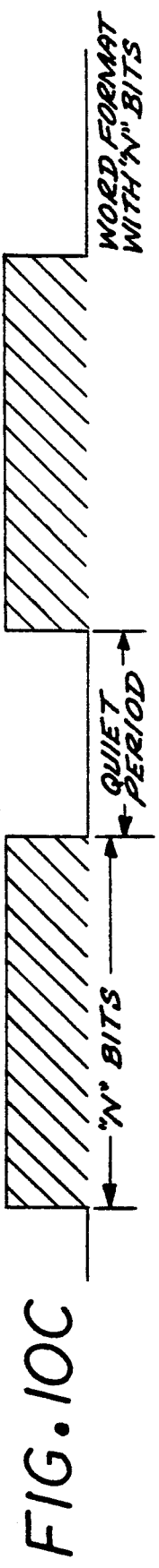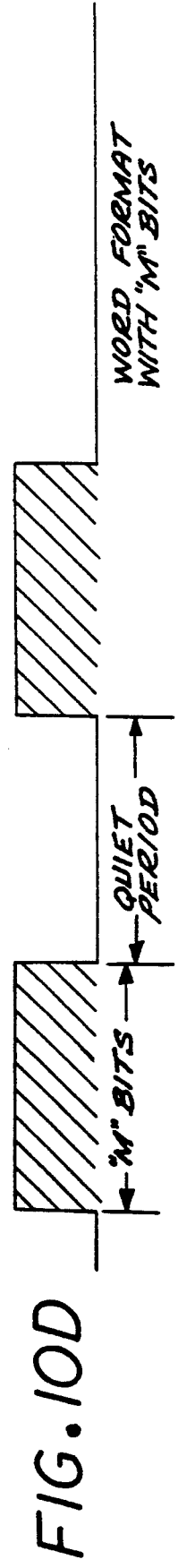

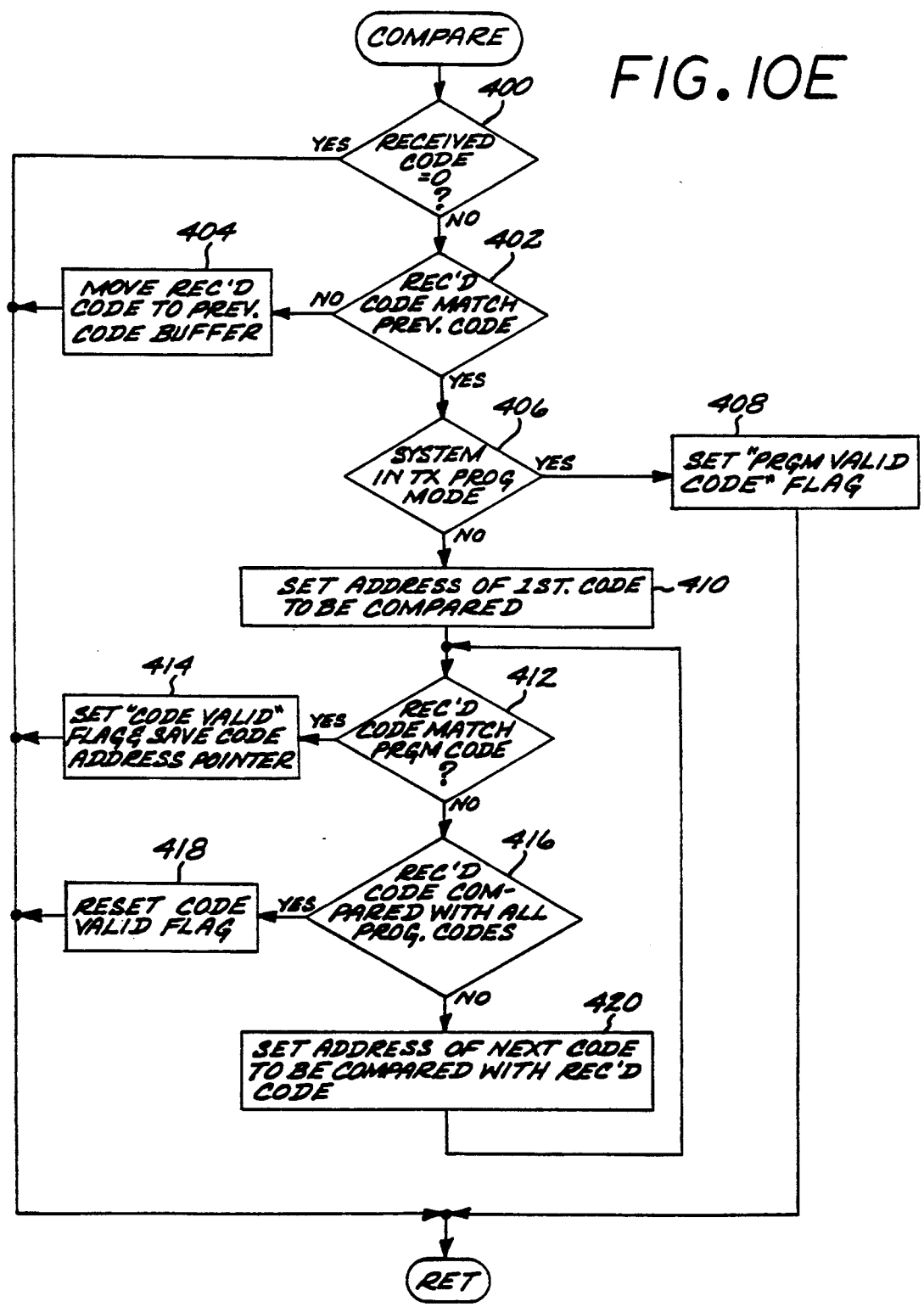

ELECTRONICALLY PROGRAMMABLE REMOTE CONTROL FOR VEHICLE SECURITY SYSTEM

This is a continuation-in-pat of application Ser. No. 07/094,395, filed Sep. 8, 1987, now abandoned. Also this application is a continuation-in-part of application Ser. No. 07/231,159, filed Aug. 11, 1988, now U.S. Pat. No. 4,922,224.

BACKGROUND OF THE INVENTION

This invention relates to certain new and useful improvements in remote control vehicle security systems, and more particularly, to remote control vehicle security systems including a receiver-control unit located in the vehicle, and one or more remote transmitters, and which systems are electronically programmable by the user without knowledge of the specific transmitter code.

In recent years, primarily due to the increase of theft, vandalism and burglaries, many vehicle owners have installed remote control security systems. The vast majority of these security systems, when triggered, will generate an audible or visible alarm signal to alert of an improper entry or intrusion into the vehicle. Many of these commercially available security systems are remotely operable, that is, they include a receiver capable of being operated from a remotely located transmitter for purposes of arming and disarming the security system. Usually, these receiver-transmitter arrangements are radio frequency operated, although they can be operated with other forms of electromagnetic radiation or sound energy.

Automotive vehicle security systems known in the art usually include an alarm section which may either generate an audible alarm, as for example, from a siren, a horn, or the like and may also often activate a visible alarm by operating any of the vehicle lights. Many of these commercially available vehicle security systems may also disable some portion of the vehicle engine system such as the ignition system, starter, fuel pump, or lock the engine compartment. Thus, in the event of an improper intrusion or attempted theft of the vehicle, the security system will cause initiation of an audible alarm or cause the lights to switch on and off and may also interfere with operation of the vehicle engine system. One example of a remote control vehicle security system is disclosed in U.S. pat. No. 4,383,242.

The use of a transmitter and a receiver which have been precoded is generally standard with commercially available remote control vehicle security systems. In these conventional transmitter-receiver combinations, the code, usually referred to as an encoded signal, is permanently encoded into the receiver, and the transmitters is preprogrammed with a code which cannot be altered or changed by the user. Thus, the receiver is operated on the basis of a security code permanently encoded in that receiver and transmitted from a particular transmitter matched and sold with that receiver. Such conventional security systems present a security exposure in case of a lost or stolen transmitter, as well as many constraints on the manufacturers, customers and dealers of these security systems. For instance, if the user of one of these security systems should lose the transmitter, it is necessary to obtain another transmitter which was not previously coded and have that transmitter properly matched and coded for the particular receiver.

The encoding of the transmitter entails obtaining the particular code required to activate the receiver, opening the transmitter housing and mechanically coding the transmitter. Usually, the coding is accomplished by scratching conductive lines on a printed circuit board, closing or opening switches or the like. Some transmitters are provided with control boards having hole areas capable of being punched to provide a particular encoded signal. Thus, some form of mechanical action is usually required for encoding the transmitter.

Most users of remote control vehicle security systems do not have the expertise to encode the transmitter and, therefore, must seek the assistance of the retailer or manufacturer of the system. The mere fact that the code for authorized actuation of the security system must be known by the selling dealer or manufacturer may inevitably lead to a breach of the security system itself, since the code is usually written to maintain a permanent record of the same. More importantly, should the user wish to change the code because of a lost or stolen transmitter, the receiver will have to be sent back to the manufacturer, leaving the user without the security system while this costly task is being performed.

In addition to the foregoing, if a user desires to have several transmitters operate the receivers of several remote control vehicle security systems, each receiver must be properly programmed with the proper code. Thus, if a person desired to operate several vehicles with the same remote control system, it is necessary to have a receiver in each car preprogrammed by a manufacturer. This necessarily requires custom design efforts which is very time consuming as well as costly.

It is, therefore, one of the primary objects of the present invention to provide a radio frequency operated remote control vehicle security system in which the receiver of the system can be electronically programmed by the user of the system without opening the transmitter, and without coding the transmitter or changing or encoding the receiver or acquiring dealer or manufacturer assistance.

It is another object of the present invention to provide a remote control vehicle security system in which neither the manufacturer, dealer or user of the system is required to know the particular code which is transmitted from the transmitter to the receiver.

It is a further object of the present invention to provide a method for a user of a remote control vehicle security system to encode a receiver from a transmitter without any prerequisite skill or the need to even open the case of either the transmitter or the receiver.

It is an additional object of the present invention to provide a remote control vehicle security system where different types of transmitters may be provided and where each transmitter may operate with different numbers of possible code bits.

It is yet another object of the present invention to provide a remote control vehicle security system where several transmitters, each with a different code, may be added to or deleted from the system at will by the user.

It is another salient object of the present invention to provide a remote control vehicle security system which can be activated by one or more of a multi-billion number of possible codes, thereby providing code security of at least two thousand times the code security of prior art systems and yet which can be manufactured at a relatively low cost.

SUMMARY OF THE INVENTION

A remote control vehicle security system which is comprised of at least one receiver connected to electronic or electrical equipment which will enable or perform various functions when activated and one or more transmitters which can actuate the receiver by generation of a code or encoded signal. The receiver is operable with a control unit and this control unit is preferably a microprocessor controlled unit in accordance with the present invention. Moreover, the receiver and microprocessor control unit can perform all of the necessary decoding functions.

In one embodiment of the invention, one or more transmitters forming part of the system may have the provision of an encoder function included therein to generate encoded signals upon actuation of the transmitters. In a preferred form, the transmitter is a microprocessor controlled device for transmitting a plurality of different channel codes, and includes means for selecting a desired channel code and means for transmitting the selected channel code. This embodiment of the invention also comprises a receiver-control unit within the vehicle, and is responsive to the encoded signal to arm or disarm the system.

The control unit performs several primary functions including a decoding function. Thus, when the receiver receives the encoded signal, the microprocessor validates and decodes the transmitted signal. Thus, there is no requirement for the provision of a separate decoder.

The remote control vehicle security system of the present invention is also highly effective in that it is electronically user programmable. Moreover, no tooling or skills are required on the part of the user in order to program the receiver. The user is not even required to open the transmitter case or receiver housing when programming the system. The user of the system may initiate the receiver's program mode so that it will enable recording of subsequent messages or encoded signals received from the transmitter during the program mode. This may be accomplished by activating a program switch either mechanically, electronically or through voice recognition. Thereafter, the user actuates the transmitter, as for example, by pressing a switch on the transmitter. This will cause the encoded signal to be transmitted by the transmitter to the receiver.

The receiver and control unit will operate to decode the transmitted signal, and the decoded signal is then programmed into a memory unit, as hereinafter described, and becomes a "signature code signal" or "signature code word." In this sense, the system of the present invention is user programmable. Moreover, it is not necessary for anyone to know the specific signature code word programmed in the control unit, initially, or at any time thereafter. The control unit will, in effect, have received the signature code of the transmitter and will record that signature code in the control unit memory.

The receiver-control unit may be arranged so as to automatically exit the signature signal program mode after recording thereof. This automatic exit may occur, for example, after a certain time delay in which no further signal has been received. Otherwise, the receiver may be arranged so that it is manually switched by the user out of the program mode.

In a multi-channel form of the invention, the user selects a particular channel in which to record a signature code word, and once the selection is made, a received code word is recorded and assigned by the control unit to that selected channel. A plurality of signature code words may be stored for each channel. During the operating receive mode, received codes are compared to the stored codes for each channel, and when a match is formed, the control unit determines the channel to which the matched code corresponds and initiates a responsive action for that channel.

The receiver-control unit in the system of the present invention may also be operated by several transmitters, and each of which may be used to operate the receiver-control unit. Each transmitter may operate with a completely different code or encoded signal than any of the other transmitters, and in this case, the receiver will be responsive to each transmitter which has its code or encoded signal recorded in the control unit as a signature code word. It is not even necessary for the transmitters to be of the same type.

Each transmitter may have a different maximum number of digital code combinations. For example, one transmitter may have a ten-lit code and therefore is able to produce one thousand twenty-four possible combinations of unique codes. Yet another transmitter may operate with a thirty-two bit code, thus possessing more than four billion possible digital codes. The construction and the operation of these transmitters may be different and each may have a different number of switches and/or codes. However, each transmitter operates on the same frequency as the receiver.

If a plurality of individuals are required to have access to the arming and disarming of the system, each may be provided with the same or different transmitters. Each such individual will initially operate his or her transmitter to record the signature of that transmitter in the control unit memory, as one of the signature code signals. After this has been accomplished, each party using any one of the transmitters, whose signatures have been recorded, may then access the system by either arming or disarming the system, or enabling specific functions assigned only to one or more specific transmitters. Moreover, the system may be armed by one transmitter and disarmed by a second transmitter, re-armed by a third transmitter, and disarmed by a fourth transmitter, etc.

Any one of the transmitters may also be programmed out of the system, that is deleted from the system, by first entering the recording or program mode, and then programming repeatedly, the rest of the transmitters until the memory of the control unit is fully loaded.

In the event that any particular transmitter is lost or stolen, it is only necessary to erase the recorded signature code signals in the memory and re-record the signature code signals from the other transmitters which have not been lost or stolen. In this way, anyone who attempts to use the lost or stolen transmitter will not be able to arm or disarm the remote control access system. There is essentially no breach in security inasmuch as one must have access to the receiver-control unit which is located in the vehicle.

The microprocessor operated control unit also performs a reading function and a comparison function. In the reading operation, the control unit will read two or more successive and sequentially transmitted and decoded signals and will recognize them as correctly (authorized—not necessarily valid) transmitted signals, if two or more successive transmitted signals correspond. In this way, the control unit can determine if there is an error in transmission.

In the comparison function, the control unit will read a transmitted and decoded signal which is often referred to as a "received signal," and then compare that transmitted and decoded signal to each stored signature code or stored encoded signal which has been previously stored in the random access memory of the processor. Thus, and in this respect, the microprocessor operated control unit will perform a comparison function.

In the comparison operation, if the encoded signal which has been received and decoded does not correspond to a previously recorded signature code signal, the microprocessor will recognize that received and decoded signal as an invalid and unauthorized signal and will not enable a disarming or arming of the security system.

If the signal which has been decoded and compared does correspond to a previously recorded signature code signal and is thereby a valid signal, then the microprocessor will either enable or disable the system or initiate various commands. For example, if the security system was armed when the valid decoded signal was received for a predetermined channel, then the control unit will enable a disarming of the system. If the system was disarmed when the valid decoded signal is received, then the control unit will enable an arming of the security system.

The term "signal," and particularly with reference to an encoded transmitted signal or a received and decoded signal, is used in a general sense to refer to a transmitted or received code which may be comprised of a plurality of bits and/or bytes of information. Thus, as a simple example, in one of the embodiments of the system of the present invention, the encoded signal may be comprised of eighteen bits of information.

In view of the above, it can be observed that among the very significant advantages offered by the remote control security system of the present invention are the following:

1) The security system is self-programmable by a user in such manner as the user can merely actuate a switch-type element on the receiver and press a button on the transmitter for programming a selected code into the receiver as a signature code signal.
2) A signature code signal may be eliminated from the receiver-control unit by recording the codes of the desired transmitters several times until the memory of the control unit is fully loaded.
3) It is not necessary for anyone to know the code for triggering of the remote control system inasmuch as any code already programmed in the remote control transmitter will be automatically recorded into the control unit memory when the system is in the program mode and the remotely located transmitter is activated.
4) The security level of the present invention can be upgraded by the user at any time, as for example, by utilizing upgraded transmitters with a substantially greater number of digital codes, or the like. In this way, for example, the remote control system can be upgraded by the owner, at will, from 16,000 possible combinations of digital codes to over 4 billion possible digital code combinations without modifying or installing a new system.
5) In reading the encoded signal transmitted from the transmitter, a reading operation is conducted by the control unit associated with the receiver or two consecutive received signals to ensure that there is no error in the received signals before determining if that received and decoded signal compares to the signature control signal.
6) The transmitter and receiver are uniquely designed so that neither has to be opened and electronic or mechanical knowledge is not required for installing a new encoded signal at any time.
7) The remote control vehicle security system of the invention can operate with numerous types of transmitters, so long as they essentially operate at the same frequency range. This enables the purchase of transmitters from a source different from the receiver and control unit.
8) The remote control vehicle security system of the invention also uses significantly fewer electronic components than the prior art systems, and as an example, a decoder is not required inasmuch as the microprocessor can perform the decoding function.
9) A multi-channel system may be provided, wherein the control unit is operable during the programming mode to record a received code word and assign that stored word to a selected channel. Each of the channels may be electronically programmed and reprogrammed by the user.

This invention possesses many other advantages and has other purposes which may be made more clearly apparent from a consideration of exemplary embodiments shown in the drawings accompanying and forming part of the present specification. They will now be described in detail for purposes of illustrating the general principles of the invention, but it is to be understood that such detailed description is not to be taken in a limiting sense.

BRIEF DESCRIPTION OF THE DRAWINGS

FIGS. 7-16F illustrate simplified flow illustrative of the operation of a remote control vehicle security system embodying the present invention.

DETAILED DESCRIPTION OF THE DISCLOSURE

Figure 1A:
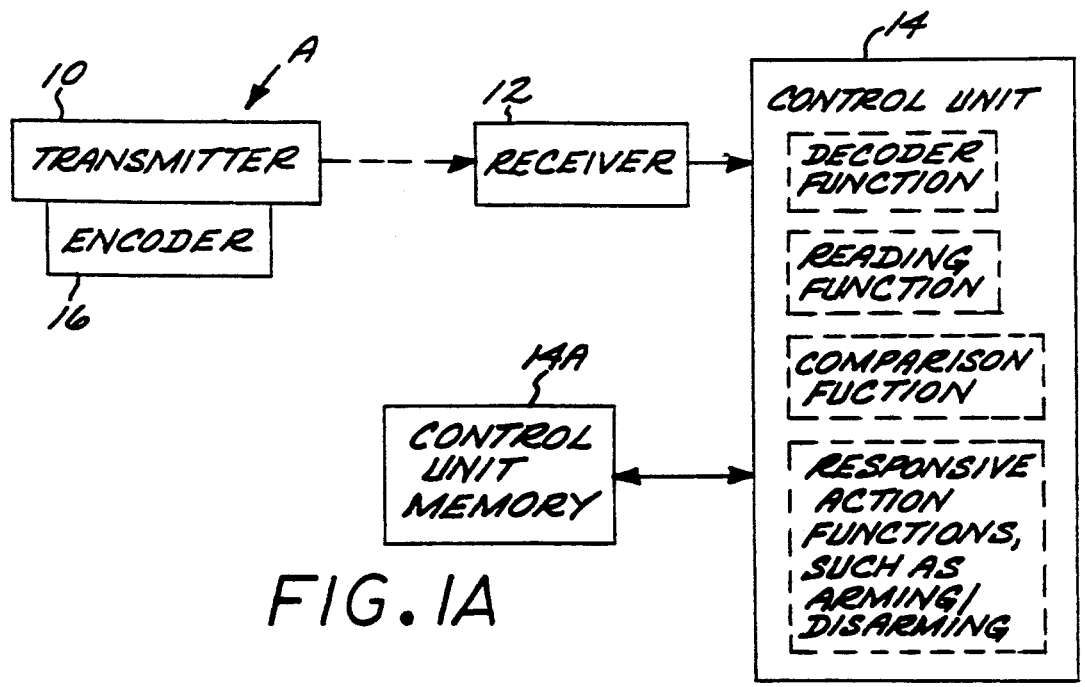
FIGS. 1A and 1B are respective block diagrams illustrating the major components of a remote control vehicle security system embodying the present invention.

Referring now in more detail and by reference characters to the drawings which illustrate practical embodiments of the present invention, A (FIG. 1A) designates a remote control vehicle security system which comprises a transmitter unit 10, a receiver 12, and a microprocessor based control unit 14 with a control unit memory 14A. The transmitter 10 is schematically shown as including an encoder 16 forming a part thereof. Moreover, the control unit 14 is shown with various functions which may be performed therein or in conjunction therewith. As an example, these functions may be performed by programming various steps into the control unit microprocessor, or otherwise, they could be performed by discrete apparatus carrying out the functions as identified. The control unit memory 14A may take the form of read only memory (ROM) buffers internal to a battery-backed microprocessor comprising the control unit 14, or a separate nonvolatile memory device such as an EEPROM communicating with the microprocessor to allow data to be read from or written into the memory by the microprocessor.

The preferred form of the transmitter unit 10 is a microprocessor-control unit as described in pending application Ser. No. 07/243,080, filed Sep. 9, 1988, entitled "Multi-Channel Remote Control Transmitter," by Ze'ev Drori and Moti Segal, and assigned to the same assignee of the present application. This pending application describes a multi-channel remote transmitter 20 which permits convenient selection and transmission of a desired channel code. The transmitter operation is controlled by a microprocessor, which interfaces with a nonvolatile electrically erasable programmable read only memory (EEPROM) in which data including signature code data is stored. This pending application is incorporated herein by this reference in its entirety.

Figure 1B:
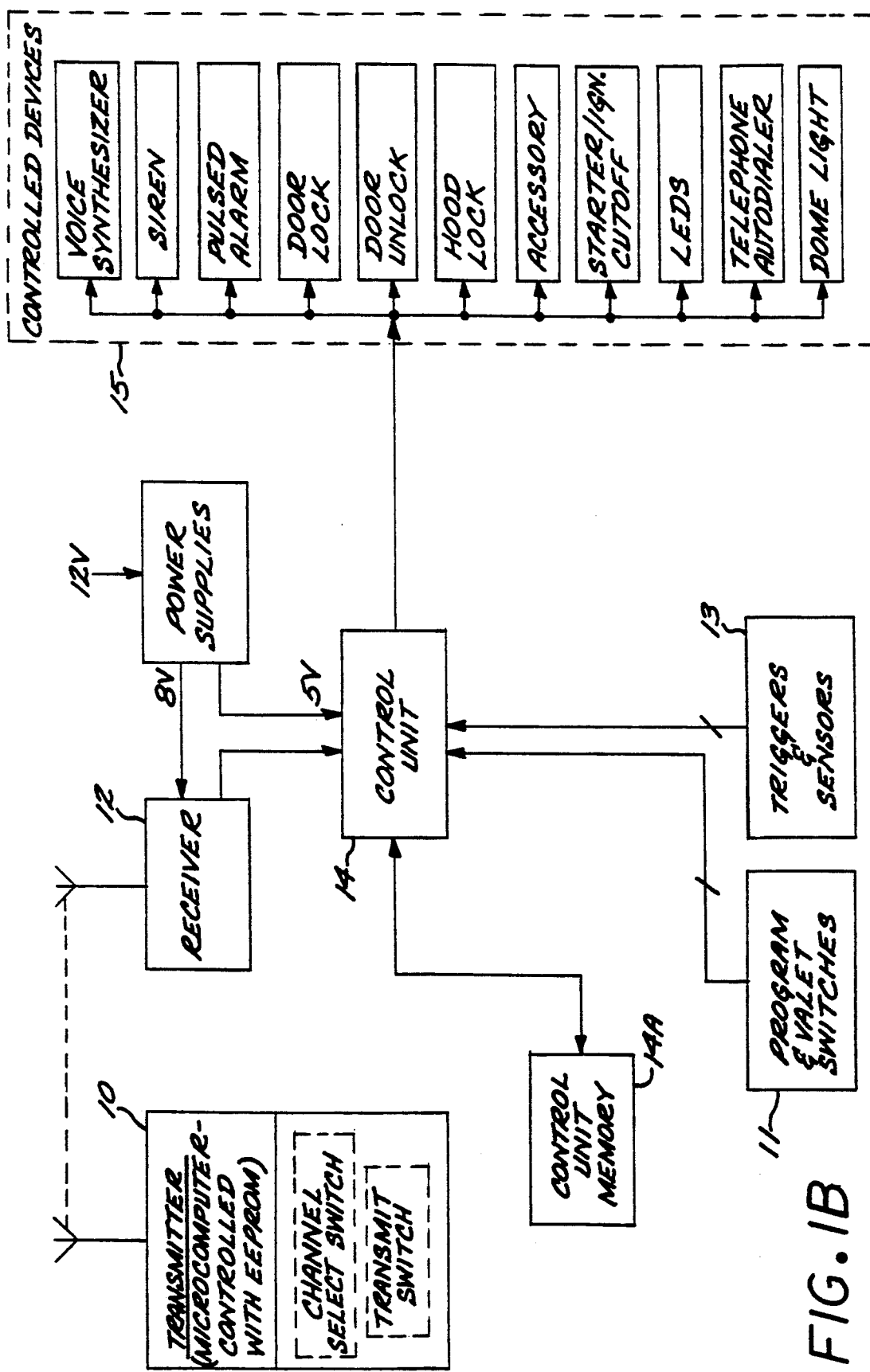

FIG. 1B illustrates additional elements of the vehicle security system, including the triggers and sensor devices 13 which are well known in the art, and the program and valet switches 11. The respective program and valet switches 11 are typically mounted within the vehicle at a location readily accessible to the system user. The devices 11 and 13 provide data input signals to the control unit 14. The control unit 14 includes outputs used to control various controlled devices in dependence on the system status and the input data, exemplary ones of the controlled devices being shown in FIG. 1A. The receiver 12 and control unit 14 will typically be installed within the vehicle at a location hidden from view, and perhaps even unknown to the vehicle owner. The transmitter 10 is shown in the form more fully described in pending application Ser. No. 07/243,080. This preferred form of the transmitter 10 is controlled by a microprocessor employing an EEPROM memory, and comprises a channel select switch actuated by the user to select a desired channel, and a transmit switch actuated to transmit the selected channel code.

Figure 3:
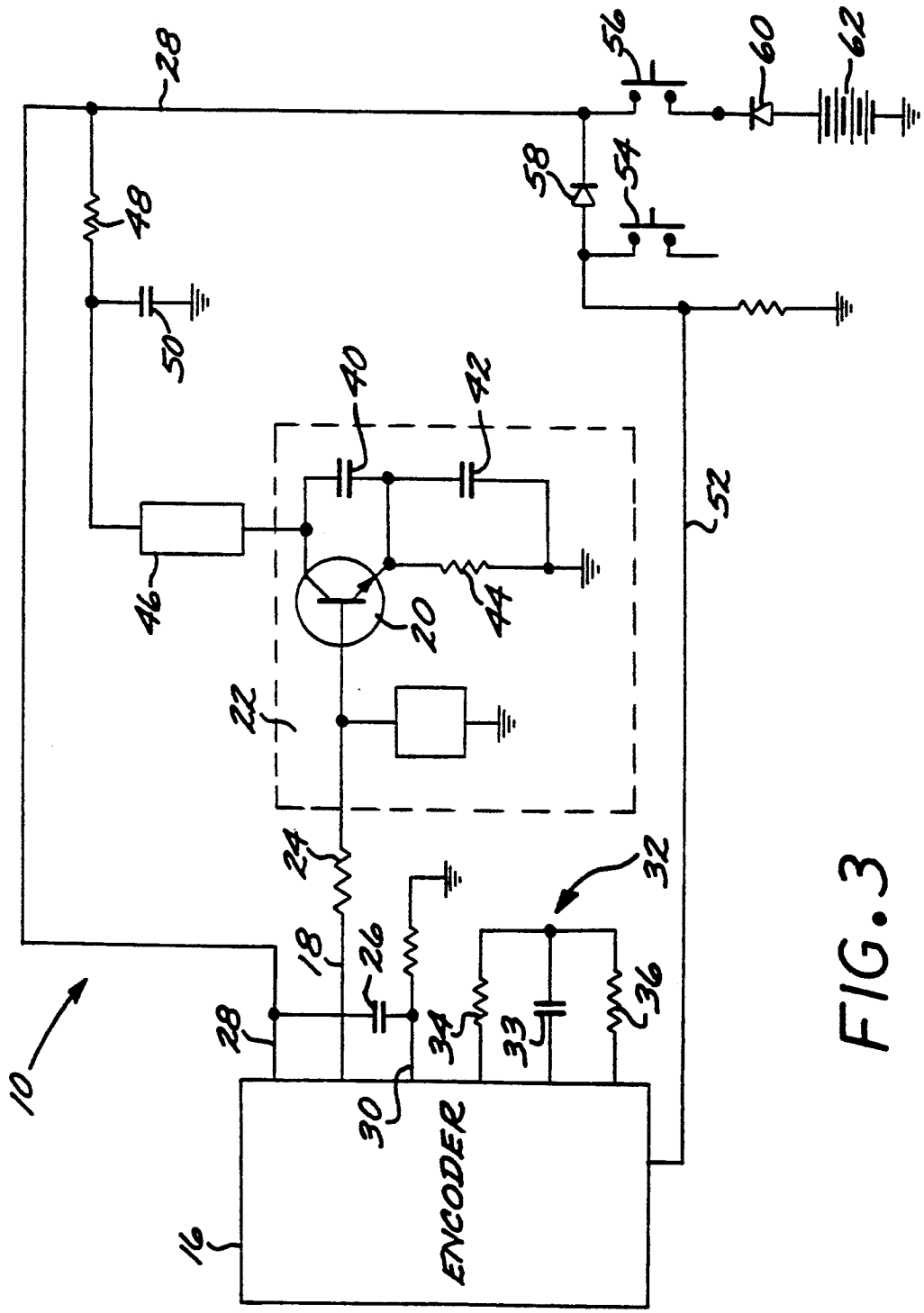
FIG. 3 is a schematic electronic circuit view showing a portion of a transmitter which may be employed in a remote control vehicle security system of the present invention embodying the present invention.

FIG. 3 illustrates another embodiment of a transmitter unit which may be constructed in accordance with the present invention. The transmitter 10 generally comprises the encoder 16 which may be suitably encoded by the manufacturer so that the user is not required to encode the same. For this purpose, small switches may be provided on the encoder, or other means known in the art could be provided on the encoder for specifically generating an encoded signal. A plurality of output lines 18 extend from the encoder 16 in the manner as illustrated in FIG. 3. One such output line 18 is connected to the base of an NPN transistor 20 forming part of an oscillator transmitter 22. The conductor 18 is also connected through a resonator 23 which is, in turn, grounded. A resistor 24 is located in the conductor 18 and serves as a current limiter due to the fact that the transistor 20 is a low impedance device.

A capacitor 26 is connected across an additional pair of conductors 28 and 30, in the manner as shown, and which operates as a reset circuit. This ensures that the encoder will start the generation of each new encoded signal when actuated on each occasion.

In addition, a resistive-capacitive network 32 is also connected to the output of the encoder 16 in the manner as shown in FIG. 3, and comprises a pair of resistors 34 and 36 and a capacitor 38. This circuit arrangement stabilizes the length of each of the bits which are generated by the encoder 16. This is important in connection with the present invention in that the receiver and the control unit may measure the duration of the bit pulses in order to determine the status of these bits, that is, whether each is a "1" or a "0" bit.

The transistor 20 has a capacitor 40 connected across its emitter and collector in the manner as shown, and an additional capacitor 42 is connected to a resistor 44 on the emitter of &:he transistor 20. The capacitors 40 and 42 are generally provided for load matching purposes and the resistor 44 provides a control bias to the transistor 20.

Connected to the collector of the transistor 20 is a load circuit 46, as for example, a portion of an antenna load. This load circuit 46 is connected through a resistor 48 to the output conductor 28 of the encoder in the manner shown. A capacitor 50 is also connected to the load circuit 46 and is grounded. In effect, the point where the capacitor is connected to the load circuit, represents a ground level value. The resistor 48 and the capacitor 50 operate to decouple a battery as hereinafter described.

Also connected to the conductor 28 and to an additional conductor 52 are a pair of manually operable switches 54 and 56. These switches 54 and 56 are operable for providing two channels to the encoder. Thus, switch 54, when actuated, will cause the generation of a first encoded signal. Switch 56, when actuated, will cause the generation of a second encoded signal. A diode 58 is connected across the switches 54 and 56, and a diode 60 is also connected between the switches 54 and 56 and a battery 62.

The transmitter unit illustrated in FIG. 3 is a two-channel transmitter. In this way, two individual encoded signals could be generated by actuation of each of the switches 54 and 56 as aforesaid. The transmitter described in the referenced pending application, Ser. No. 07/243,080, is a multi-channel transmitter for generating many coded signals. However, it should also be understood that a single channel encoder could be used. Moreover, various multiple channel encoders, such as, for example, a three-channel encoder or a four-channel encoder, etc., could be employed with slight modification of the circuitry as described herein.

When any one of the switches 54 and 56 are closed, they will complete a circuit to the encoder 16, causing generation of an electrical signal over the conductor 18 and which is, in turn, transmitted as an encoded radio frequency signal, via the load 46 to the receiver 12.

Figure 4:
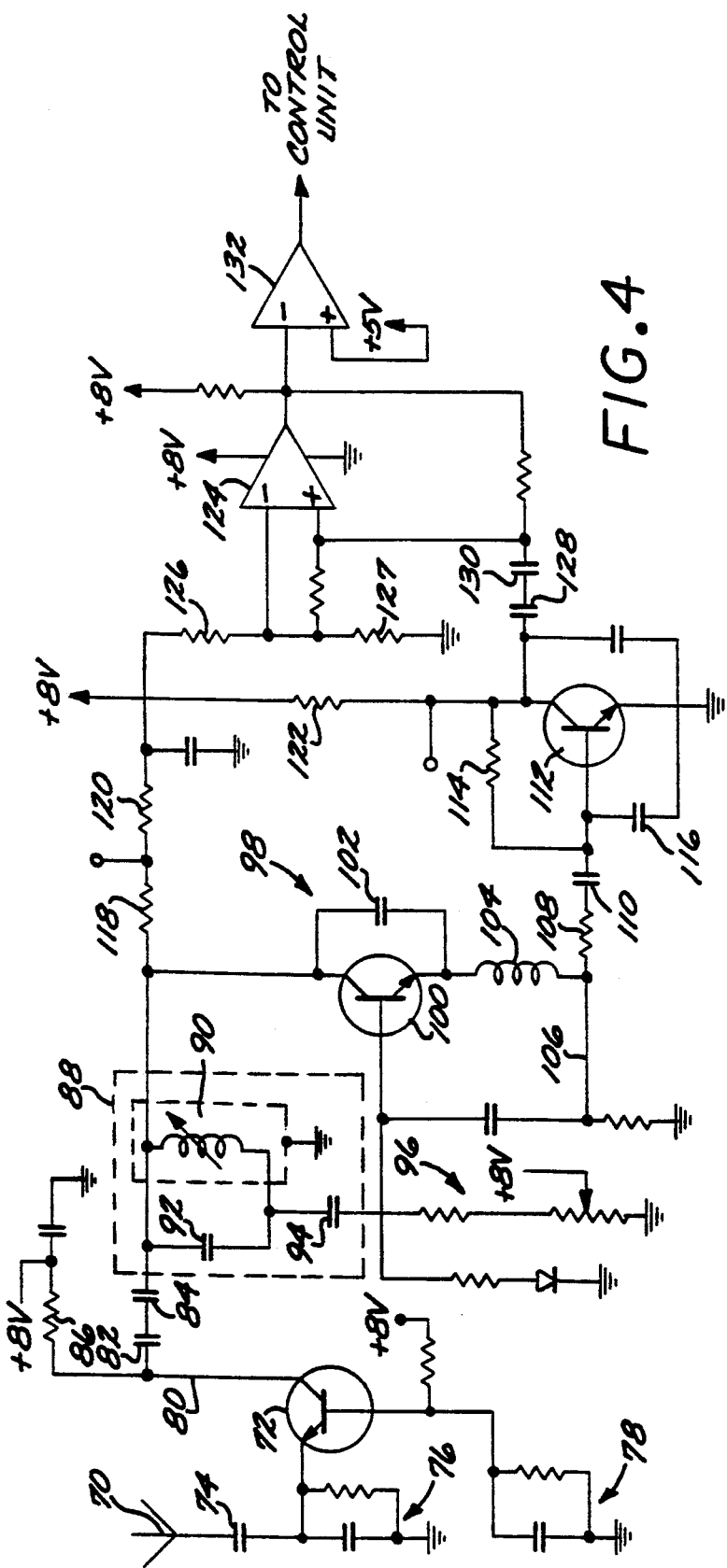
FIG. 4 is a schematic electronic circuit showing one embodiment of a receiver forming part of a remote control vehicle security system embodying the present invention.

The receiver 65 is more fully illustrated in FIG. 4 and generally comprises an antenna 70 for receiving the transmitted signals, which are coupled by capacitor 74 to an NPN transistor 72 which matches the impedance of the antenna 70, and operates as a radio frequency preamplifier. A resistor-capacitor network 76 is connected to the emitter of the transistor 72. A second resistor-capacitor network 78 is connected to the base of the transistor 72.

The collector of the transistor 72 is coupled via the conductor 80 to coupling capacitors 82 and 84. An 8-volt power source from the power supplies is connected to the collector of the transistor 72 through a resistor 84 which isolates the transistor 72 from the power supply and from the load.

Tank circuit 88 comprises a variable inductive device 90 for adjusting the receiver regenerative frequency. A capacitor 92 couples one end of the inductive device 90 to the conductor 80. The same end of the inductive device 90 is also coupled through capacitor 94 to a variable resistor 96, also connected to the 8-volt power source.

The conductor 80 is also connected to a local oscillator 98 which includes a transistor 100 having a capacitor 102 connected across its collector and, the conductor 80 being connected to the collector of transistor 100. The base of the transistor 100 is connected to the voltage source through the resistor 96. The emitter of the transistor 100 is connected to inductor 104. This arrangement of the local oscillator including the transistor 100, the capacitor 102 and the inductor 104 is designed to detect the pulses included in the received signal.

The inductor 104 is connected to conductor 106 which carries the detected signal. The detected signal pulses are passed through a resistor 108 and a capacitor 110 and to a signal amplifier 112 in the form of an NPN transistor. Another resistor 114 is connected across the collector and the base of the transistor 112, whose emitter is grounded and is also connected to a coupling capacitor 116.

The collector of the transistor 100 is connected to a pair of load resistors 118 and 120. The 8-volt power supply is connected through a load resistor 122 to the collector of the transistor 112. The reference voltage applied to the comparator 124 is developed by the voltage divider circuit comprising resistors 126 and 127. The comparator 124 receives a signal for comparison from the collector of the transistor 112 through a coupling capacitors 128 and 130. When the inputs to the comparator 124 compare, an output is generated and inverted by an inverter 132.

Figure 5:
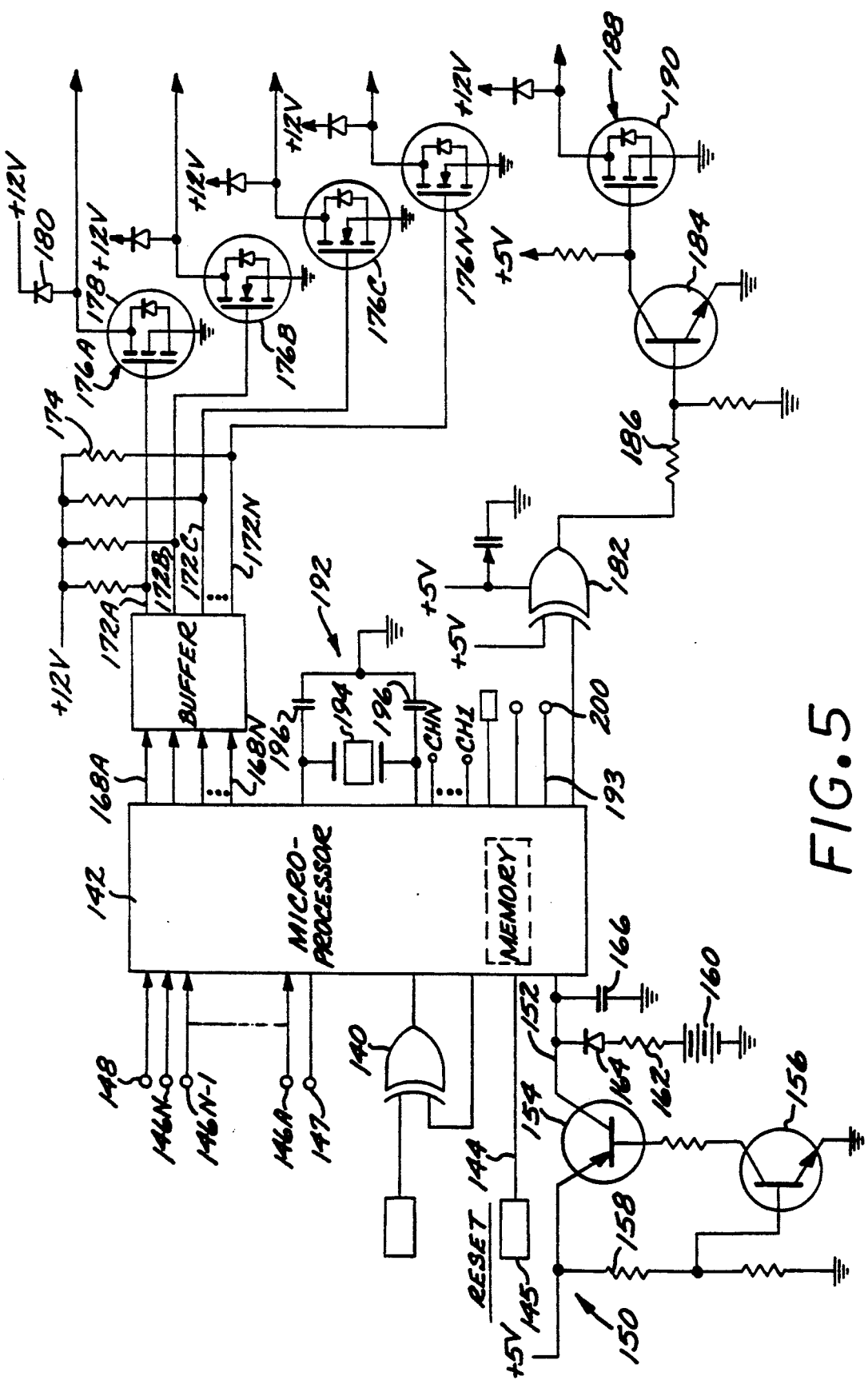
FIG. 5 is a schematic electronic circuit showing the control unit forming part of a remote control security system embodying the present invention.

The output of the inverter 132 is then introduced into the control unit 14, as is more fully illustrated in FIG. 5. In this case, the output from the receiver 12 is introduced into an exclusive OR gate 140 (acting as a programmable inverter) which has an output to a microprocessor 142 with some internal RAM memory capacity, such as the NEC 80C49H microprocessor.

The microprocessor 142 receives a conductor carrying a reset input signal 144 from a reset signal generating circuit 145, as shown in FIG. 5. This reset signal generating circuit 145, which is sometimes referred to as a "watchdog" circuit, will automatically generate a reset signal each time that power is applied to the system, that is, each time that the system is "powered-up."

The reset signal generating circuit 145 may adopt any form of circuit which is capable of generating a reset signal. However, in the embodiment employed, a retriggerable one-shot is connected to and operable in conjunction with a standard one-shot and capacitor. The capacitor may be connected to the standard one-shot through an NPN transistor and grounded. The collector of the NPN transistor would then be connected to the conductor 144. This arrangement has not been illustrated or described in any further detail herein inasmuch as any standard resetting circuit arrangement could be employed.

The microprocessor 142 also receives a plurality of input signals 146A-N, 147 and 148. The input signal 147 represents a valet switch state, and the input signal 148 represents a program switch state, both from the valet and program switches which are typically located in the vehicle. The other inputs 146A-N into the microprocessor 142 are from the sensors and trigger devices 13 comprising the vehicle security system, for example, a hood lock trigger, a door trigger, a vibration sensor, etc. Otherwise, other forms of input signals may be generated and introduced into the microprocessor 142 in the same manner as any of the signals 146A-N.

The microprocessor 142 may be powered through the power supplies connected to the vehicle battery, and backed up by means of a battery circuit 150, as shown in FIG. 5 and which comprises a conductor 152. The conductor 152 may be connected to the 5-volt power supply in the manner as shown. Also located in the conductor is an NPN transistor 154 which effectively functions as a diode to prevent current from moving back toward the 5-volt source and only enables current to be delivered to the microprocessor 142. The gate of the NPN transistor 154 is connected to the collector of another NPN transistor 156. The base of this transistor 156 is connected between a voltage dividing circuit 158 which controls the threshold voltage applied to the microprocessor 142. A battery 160 and a diode 164 are connected in the manner as illustrated to provide back-up power in the event the vehicle battery is disconnected or disabled, thereby preventing loss of stored data in the RAM memory buffer. A grounding capacitor 166 is also connected to the conductor 152 in the manner as illustrated in FIG. 5.

As an alternative to the battery-backed microprocessor arrangement, an EEPROM memory device may be interfaced to the microprocessor 142 to provide nonvolatile memory buffers for storing the programmed data. The interfacing of a microprocessor to a peripheral device such as an external EEPROM is well known in the art. With this nonvolatile memory, the programmed data will be saved even in the event of power loss to the microprocessor.

The microprocessor 142 has a plurality of output signals 168A-N which are generally 4-volt signals and which are introduced into a buffer-amplifier 170. This buffer-amplifier 170 produces a plurality of outputs 172A-N. Moreover, each of the outputs 172A-N are connected to a 12-volt power source through coupling resistors 174 in the manner as illustrated, such that the outputs are raised to 12 volts. Each of the amplified signals 172A-N are then introduced into output circuits 176A-N in the manner as illustrated in FIG. 5.

The output circuits of FIG. 5 each generally comprise a field-effect transistor 178 which is connected through diodes 180 to a 12-volt power source. The various outputs from the output circuits 176 may provide responsive functions in the protected environment. For example, a first output 176A may actuate a siren. A second output 176B may provide for a pulsed alarm. A third output 176C may provide for an automatic door lock or an automatic unlocking of a door. Another output 176N may provide for an ignition cut-off, that is, so that the ignition of a vehicle could not be started in the event of an intrusion or an unauthorized entry into the vehicle. Other forms of outputs could similarly be provided.

A special output from the microprocessor 142 in the form of a hood unlock signal is introduced into an inverter assembly 182 and then into an NPN transistor 184 which amplifies the signal. A coupling resistor 186 connects the base of the transistor 184 to the output of the inverter. The collector of the transistor 184 is connected to an output circuit 188 which is also comprised of a field effect transistor 190. This signal serves to automatically unlock the hood when generated. The generation of the hood unlock signal is authorizedly initiated by the control unit 14 of the system for a thirty-second time period after initially disarming the system.

Additional outputs from the microprocessor 142 are the decoder channel outputs CH 2 . . . CH N which are activated by receipt of a valid signature code word for the respective channels. Upon receipt of such a valid code word, the corresponding channel output will be activated for a minimum period of 0.5 seconds.

Also connected to the microprocessor 142 is an oscillator control circuit 192 comprised of a crystal oscillator 194 and having a pair of capacitors 196 connected to the outputs thereof. This crystal oscillator 192 generates a control frequency which controls the speed of operation of the microprocessor 142 and generates the clocking signals therefore.

The microprocessor 142 also generates a plurality of control light outputs 198 which may control light emitting diodes 200 or other forms of light emitting devices. A pair of these signal light outputs may inform the user whether the system is turned on or off, and a third of the signal light outputs may inform the user if the microprocessor is running code in a correct sequence. It should be understood that other forms of output signal lights for generating other informational outputs may be employed in accordance with the present invention.

Figure 7:
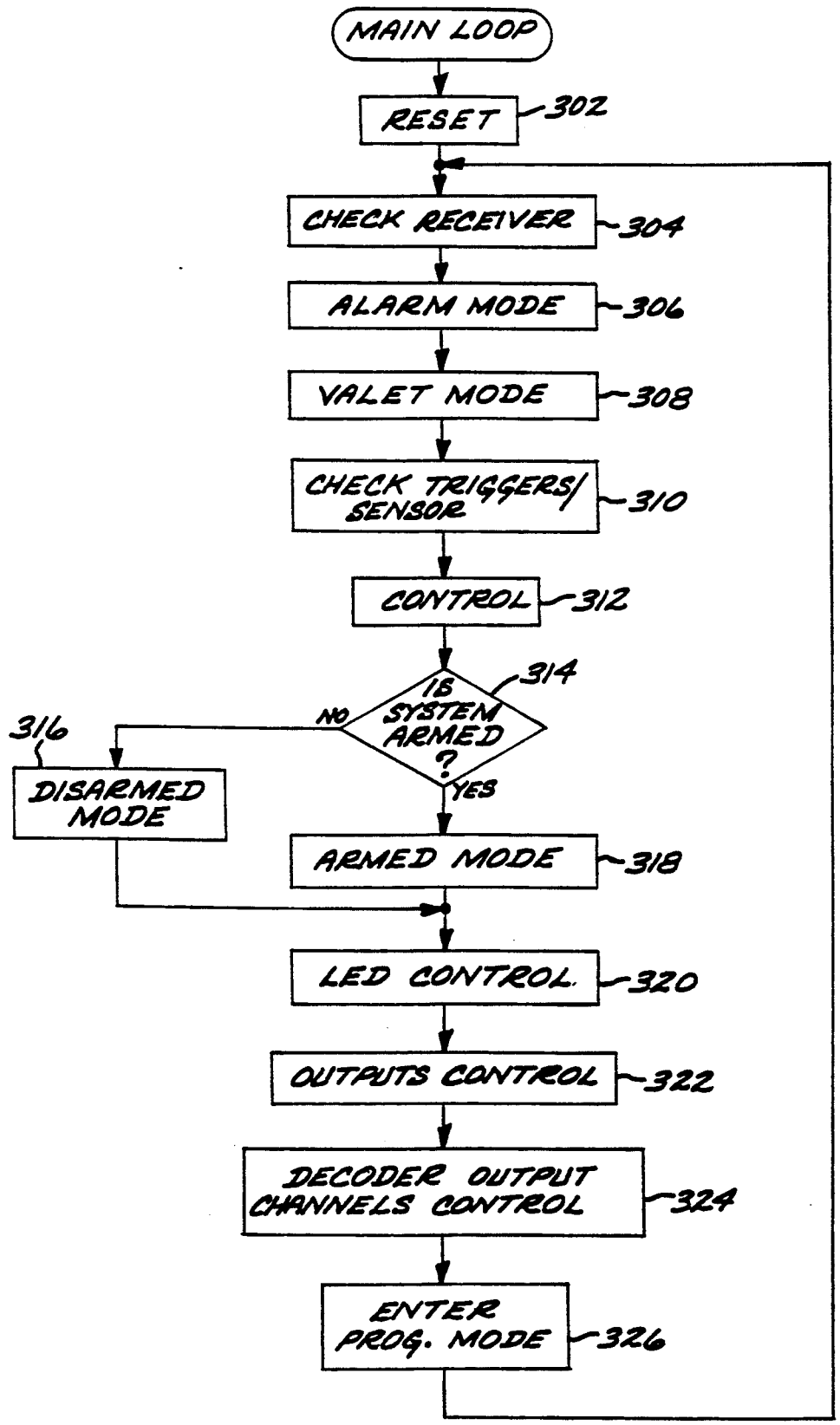

Referring now to FIGS. 7-16, the operation of the system is shown in simplified flow diagram form. FIG. 7 is a flow diagram illustrating the primary routines of the main program loop implemented by the control unit microprocessor. Upon entering the main loop, the RESET routine 302 is called, to initialize the system parameters. This routine is entered when power is applied to the system controller microprocessor, and is described more fully with respect to FIG. 8.

The next routine called during the main loop operation is the CHECK RECEIVER routine 304. This routine monitors the receiver operation to determine when a complete word has been received, and to determine whether the received word corresponds to a stored signature code word. This routine is described more fully with respect to FIGS. 10A-10E.

The ALARM MODE routine 306 determines whether the alarm conditions are present, and activates the appropriate flags and signals to cause the alarm events to be activated, such as a siren. Such an alarm mode routine is described in the pending application, Ser. No. 07/231,159, filed Aug. 11, 1988, entitled "Electronic Vehicle Security System," by Ze'ev Drori and Amir Abrishami and assigned to the assignee of this application. The entire contents of this co-pending application are incorporated herein by this reference.

The VALET MODE routine 308 is called next, and its purpose is to configure the system so that the vehicle may be left with a service garage or parking attendant without causing activation of the alarm system inadvertently. Such functions are per se known in the art. The VALET MODE routine is described more fully with respect to FIG. 11.

The CHECK TRIGGERS/SENSORS routine 310 is called next. Its purpose is to check the status of the system sensors and triggers 13. The status is determined by the interrogation of the input signals 146A-N to the microprocessor 142.

The CONTROL routine 312 determines whether the system should be armed or disarmed, and will be described more fully with respect to FIG. 12. Depending on the armed/disarmed state of the system, either the DISARMED MODE routine 316 or the ARMED MODE routine 318 will be called. These routines perform the various monitoring and housekeeping functions required during the respective states of the system. Similar functions are described in the pending application Ser. No. 07/231,159.

The next routine to be called is the LED CONTROL routine 320, which controls the LEDs 200. The OUTPUTS CONTROL routine 322 serves to turn on and off the output signals from the microprocessor in order to control the various output devices associated with the system. Similar functions are also described more fully in the pending application Ser. No. 07/231,159.

The DECODERS OUTPUT CHANNELS CONTROL routine 324 controls the various channel output states in dependence on the decoded received signals. This routine is described more fully with respect to FIG. 13.

The final routine in the main loop is the ENTER PROG MODE. This routine is called to perform the various programming functions carried out, including the programming of the transmitter signature code signals. Two alternate routines are disclosed in FIG. 15 and FIGS. 16A-F, respectively. Operation then loops back to routine 340, and the loop is repeated again. The routine is repeated continuously so that, for example, the various sensors and triggers are interrogated and the receiver output is checked many times per second.

The RESET routine 302 is shown more fully in FIG. 8, and comprises the steps of initializing the input and output terminal conditions of the microprocessor (step 330) and initializing the random access memory registers (step 332) comprising the microprocessor 142 in which data is stored during the system operation. This routine is entered after the system has powered up, which will typically occur only if the vehicle battery has been disconnected and then reconnected, since the system receives power from the vehicle battery continuously even when the vehicle ignition is turned off. As a security feature described more fully in pending application Ser. No. 07/138,828, the alarm condition will be declared unless the ignition switch is turned on while the battery is reconnected. Thus, at step 334 the ignition switch is checked and if on, the ARM flag is cleared and the program operation returns to the main loop. If the ignition switch is not on, then at step 338 the ARM and TRIP flags are set and operation returns to the main loop. (Active ARM and TRIP flags will call activation of the alarm siren.)

A microprocessor operation which is conducted in the background of the main loop operation on an interrupt basis is the RECEIVER BIT ASSEMBLER routine illustrated in FIG. 9. The purpose of this background routine is to assemble on a real time basis the bits of a received signal as they are received. The bit format employed in this embodiment is illustrated in FIG. 10B, wherein the width of each pulse determines whether the pulse represents a "1" or a "0." A "1" pulse is longer than a "0" pulse as illustrated in FIG. 10B. A signature code signal or word comprises a predetermined number of bits, such as N bits, M bits or the like. Successive transmitted code signals or words are separated in time by "quiet" periods as shown in FIGS. 10C and 10D; FIG. 10C representing an N bit word format and FIG. 10D representing an M bit format where N does not equal M, M in this case being fewer bits than N.

Step 350 of the RECEIVER BIT ASSEMBLER routine of FIG. 9 determines whether the receiver output is on a falling edge, and if not, the time is registered (step 352) and operation branches to step 366 where the quiet period timer is reset.. If a falling edge is detected, then the bit time is calculated (step 354), and if the bit length corresponds to a "0," a "0" bit is shifted into the received word buffer of the microprocessor (step 358). Otherwise the bit is determined to be a "1," and a "1" bit is shifted into the buffer. If the bit counter for the word length equals N step 362), the predetermined length of the signature code word, the counter is reset (step 364), and the quiet period timer is reset (step 366). If the bit counter does not equal N, then step 364 is bypassed. Operation then returns to the main loop operation from wherever the interrupt occurred.

The CHECK RECEIVER routine is illustrated in further detail in FIG. 10A. At step 370, the quiet period timer is checked, and if it has not timed out, operation returns to the main loop. If the timer has timed out, indicating that the complete word has been received, then the bit counter is checked. In this embodiment, the possible signature code lengths are N and M bits. Thus, if the received word length is either N (step 372) or M (step 374), then the bit counter is reset (step 375) and the COMPARE subroutine 376 is called. If the word length does not equal either M or N, then the received word cannot be a valid signature code word and operation returns to the main loop.

The COMPARE subroutine is illustrated in FIG. 10E. If the received code is all zero bits (step 400), operation returns to step 378, since all zero words are considered illegal codes. The microprocessor maintains two code buffers, one for storing the previously received code word, the other for storing the present received code word. If the present received code word does not match the previously received code word (i.e., two identical code words have not been successively received) at step 402, the presently received code word is moved to the previous word buffer (step 404) and operation returns to the main loop. If the presently received code word matches the previous code word, then, if the system is in the transmitter program mode (step 406), the "PRGM VALID CODE" flag is set (step 408) and operation returns.

If the system is not in the transmitter programming mode, then at step 410 the address for the first stored signature code word to be compared is set, and the received code is compared with this stored code word (step 412). If the received code word is identical with the stored signature code word, then the VALID CODE flag is set, the code address pointer (indicating the channel number) for the matched stored signature code word is saved (step 414) and operation returns to step 378. If a match is not found, then if the code has not been compared against all stored signature code words (step 416), the address for the next stored word to be compared is set (step 420), and operation loops back to step 412 to perform the comparison. If the received code has been compared with all stored signature control words, then at step 418 the CODE VALID flag is reset or cleared, and operation returns to step 378.

At step 378, if the system is in the transmitter programming mode, operation returns to the main loop. If not in the transmitter programming mode, then if the CODE VALID flag is not set, operation returns to the main loop. If the flag is set (step 380), then if the received code was the channel 1 code word, the CH 1 ON flag is set, the CH 1 timer is reset to 0.5 seconds (step 384), and operation returns to the main loop. I the received code is the channel 2 code word (step 386), then the CH 2 ON flag is set, and the CH 2 output timer is set to 0.5 seconds. Operation then returns to the main loop.

Figure 11:
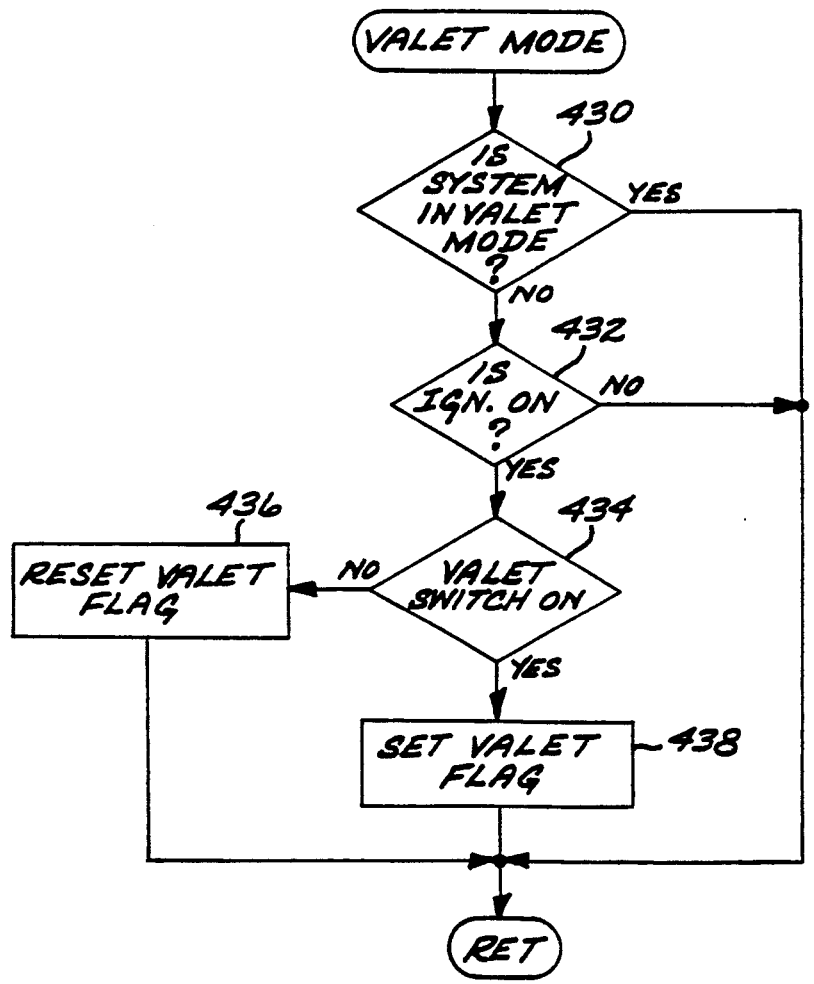

The VALET MODE routine is illustrated in FIG. 11. Here, if the system is in the VALET MODE at step 430, i.e., if the VALET flag is already set, operation returns to the main loop. If not, then at step 432 the ignition switch is checked, and if not on, operation returns to the main loop. If the ignition switch is on and if the valet switch is on (step 438), then the VALET flag is set and operation returns to the main loop. If the valet switch is not on, the VALET flag is reset or cleared (step 436) and operation returns to the main loop. Thus, in order to enter the VALET MODE, both the ignition and valet switches must be on.

Figure 12:
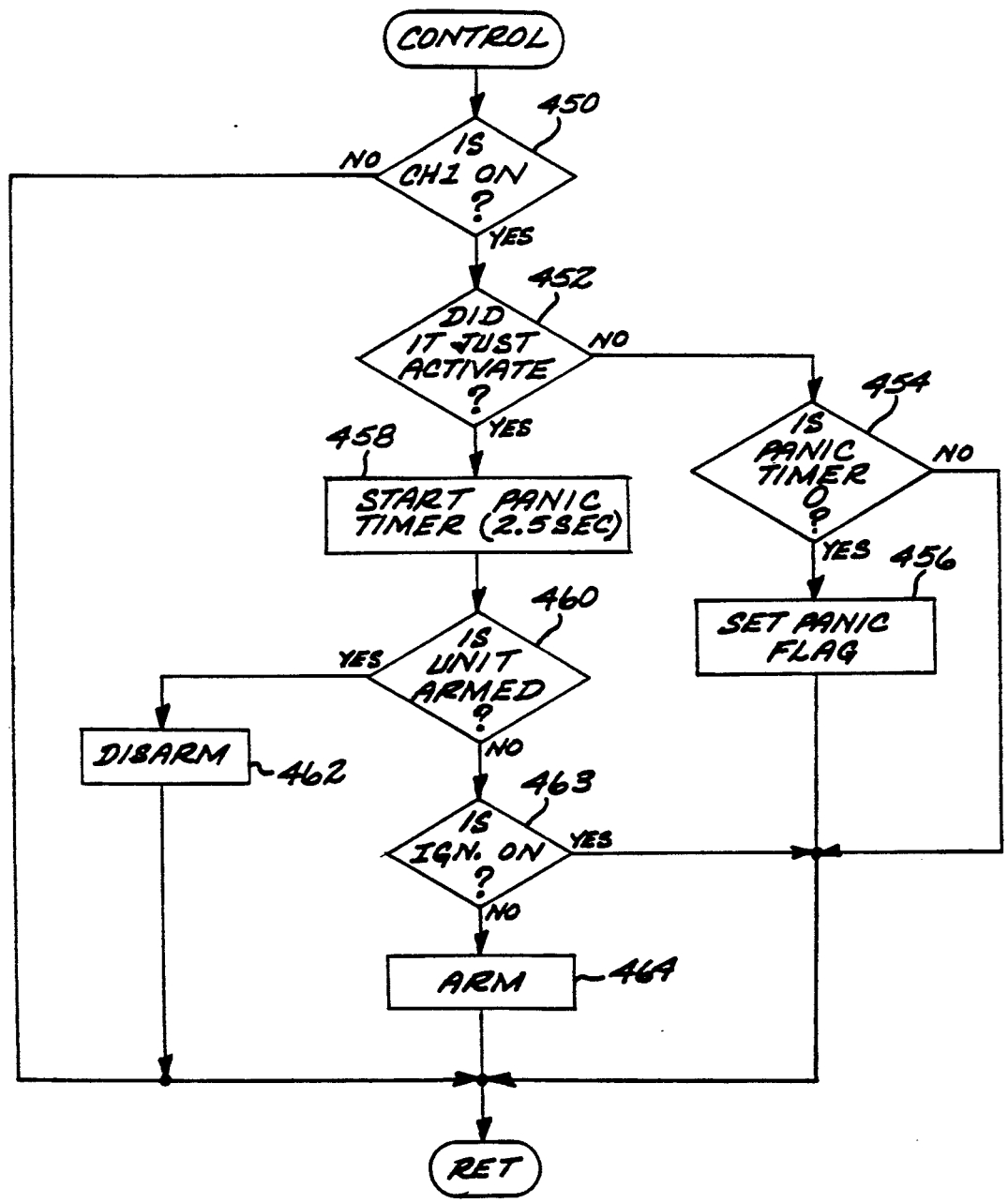

The CONTROL routine is shown in FIG. 12. In this embodiment, channel 1 is used to arm and disarm the system (for a single channel system embodying the invention, that channel is used to arm and disarm). If the CH 1 ON flag is set at step 450 indicating receipt of a valid signature code word for channel 1, then if the flag was not set since the last pass through this routine (step 452), the panic timer is checked at step 454. This timer measures the length of time the code has been transmitted repeatedly, and if the timer has not timed out (2.5 seconds), operation returns to the main loop. If the timer has expired, the PANIC flag is set (step 456) indicating that the transmitter user desired to trigger an alarm condition and operation returns. If the CH 1 ON flag has just been activated (step 452, then if the system is presently in the armed state (step 460), the DISARM routine is called (step 462) to disarm the system. If the system is presently in the disarmed state, then the ignition switch is checked at step 463, and if on, operation returns to the main loop. This is to prevent the system from being armed while the vehicle is being driven to prevent a safety hazard. If the ignition switch is not on, then the system considers it safe to arm the system, and the ARM routine is called for this purpose (step 464).

Figure 13:
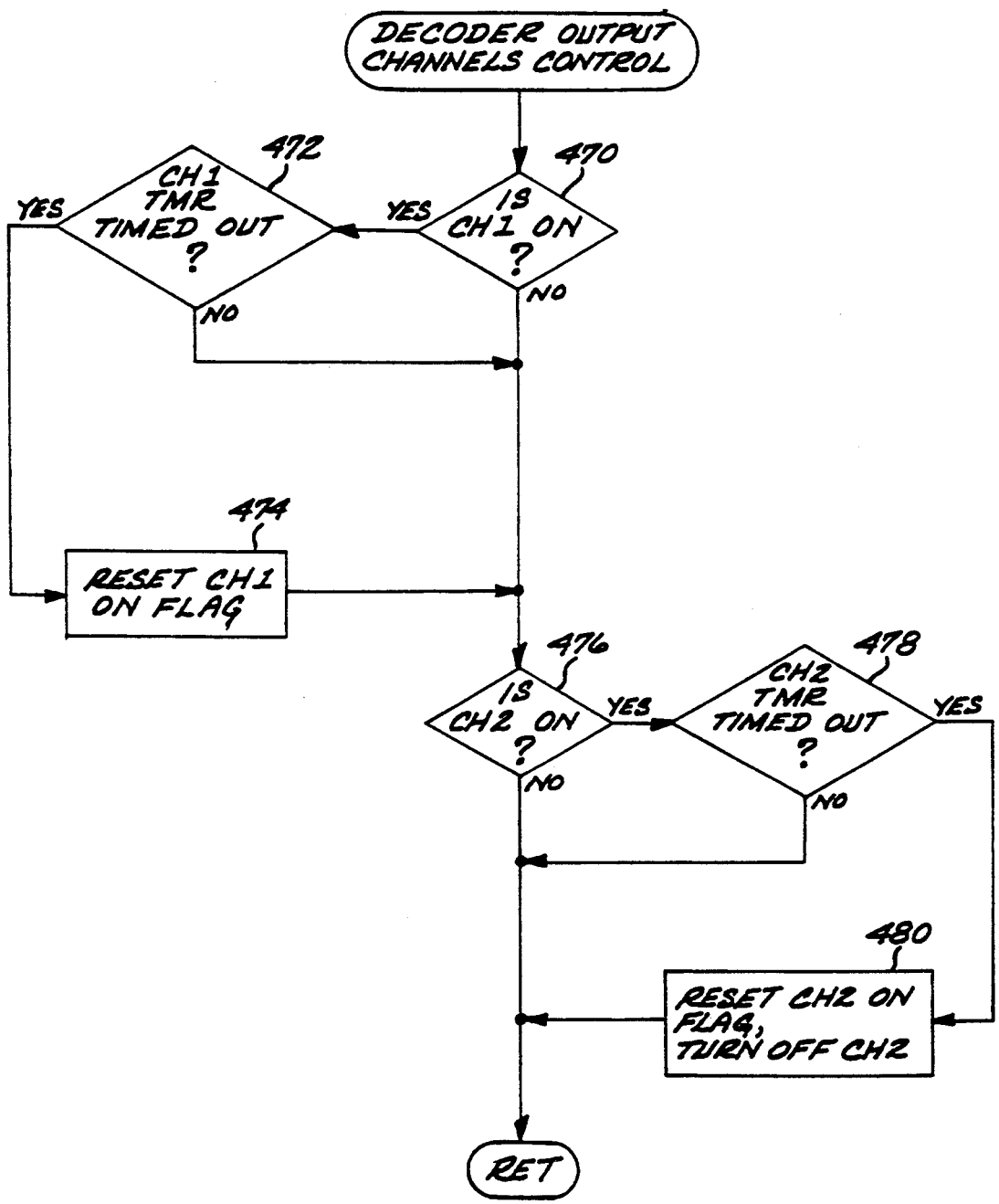

FIG. 13 illustrates the DECODER OUTPUT CHANNELS CONTROL routine. Step 470 checks the CH 1 on flag and if on, the timer for channel 1 is checked. This is a 0.5 second timer, and if it has timed out, then at step 476, the CH 2 ON flag is checked, and if it is set, then the channel 2 timer is checked (step 478). If it has timed out, then the CH 2 ON flag is reset. If the timer has not timed out, then operation returns to the main loop. Thus, once set, the channel on flags remain set for 0.5 seconds after the receipt of the valid code for that channel. Of course, if the system employs more than two channels, then the additional channel flags, e.g., CH3 ON, CH4 ON, and so on, will be checked and corresponding microprocessor output activated when a channel flag is active.

Figure 14:
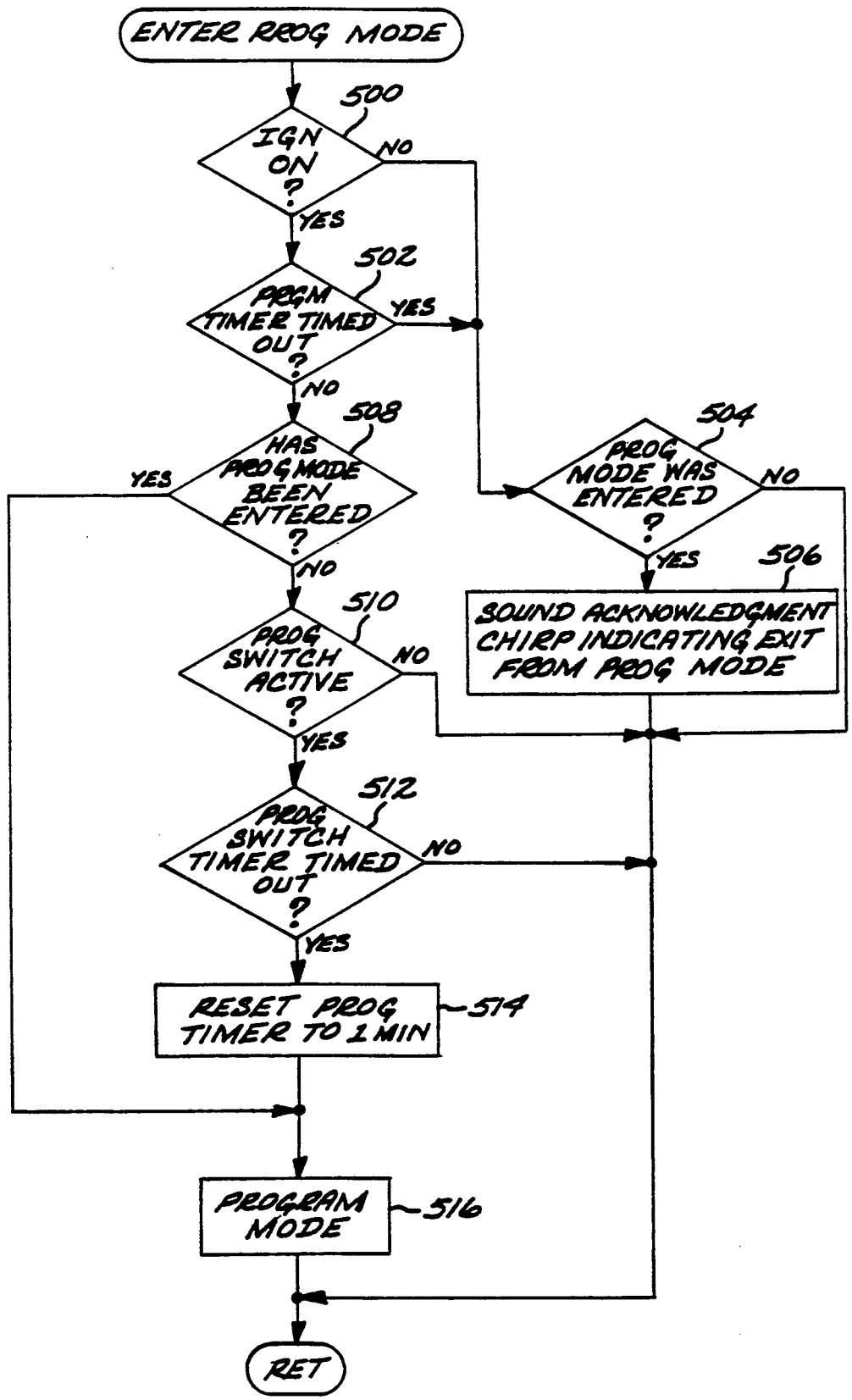
Figure 15:
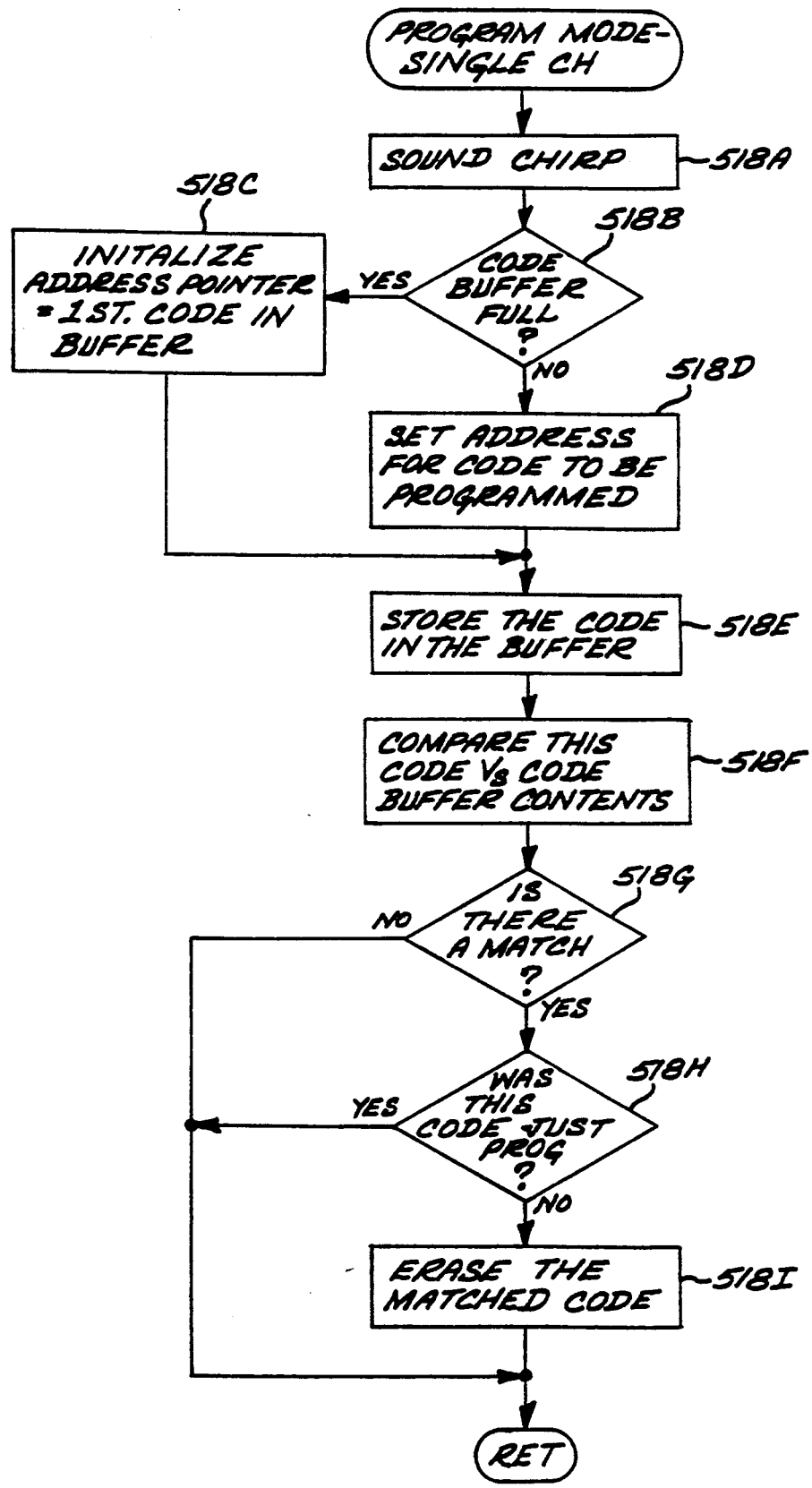

FIGS. 14-16 illustrate the system programming mode. FIG. 14 illustrates the ENTER PROG MODE routine. In this embodiment, the program mode is entered by turning on the ignition switch and actuating the program switch. Thus, at step 500 the ignition switch is checked, and if not on, and if the program mode had not been entered prior to this pass through the main loop (step 504), operation returns to the main loop. If the programming mode has been entered, then an acknowledgement chirp is sounded indicating exit from the program mode (step 506) and operation returns to the main loop. If the ignition switch is on, then the program switch timer is checked and if it has timed out, step 504 is carried out. The program switch timer measures how long the program switch has been actuated, the program mode being entered only when the program switch has been actuated for at least a predetermined time duration, say 1 second. The switch timer duration is set to the predetermined time duration, so that when the switch timer times out, the program mode is entered. If the timer has not timed out, then at step 508, if the program mode has already been entered, the subroutine PROGRAM MODE is immediately called (step 514). If the program mode had not previously been entered, the program switch is checked (step 510) and if it is not active, operation re&urns to the main loop since this indicates that the program mode has not been selected by the user. If the program switch is active, then the program switch timer is checked and if it has not timed out, operation returns to the main loop. If the program switch timer has timed out, the program timer is set to one minute (step 514) the subroutine PROGRAM MODE is now called (step 516). The program timer in this embodiment has a predetermined duration of one minute, and allows a one minute interval after the last user programming activity before automatically terminating the program mode.

FIG. 15 illustrates the PROGRAM MODE subroutine for a single channel system. Because there is only one channel to be recorded, no additional programming selection tasks are required. At step 518A, an acknowledgement chirp is sounded indicating to the user that the program mode has been entered. At step 518B, the signature code word memory buffer is checked to determine whether the buffer is full. In this embodiment, the buffer capacity is predetermined, for example, eight possible code word addresses. If the buffer is full, i.e., with all eight addresses containing data, then at step 518C, the address pointer is initialized to the first code address in the buffer, since the new code will be stored in this first code memory location, with the previous contents being erased. Otherwise, if the buffer if not full, the address is set to the first empty buffer code address (step 518D). At step 518E, the new code received by the system is stored in the code buffer. The new code is then compared with the other stored code words (518I) and if there is a match (i.e., the identical code is already stored in the buffer), and if this code is the one just stored, then it will be erased. This prevents the same code from being stored in the memory at more than one location. Operation then returns to the main loop.

Figure 16A:
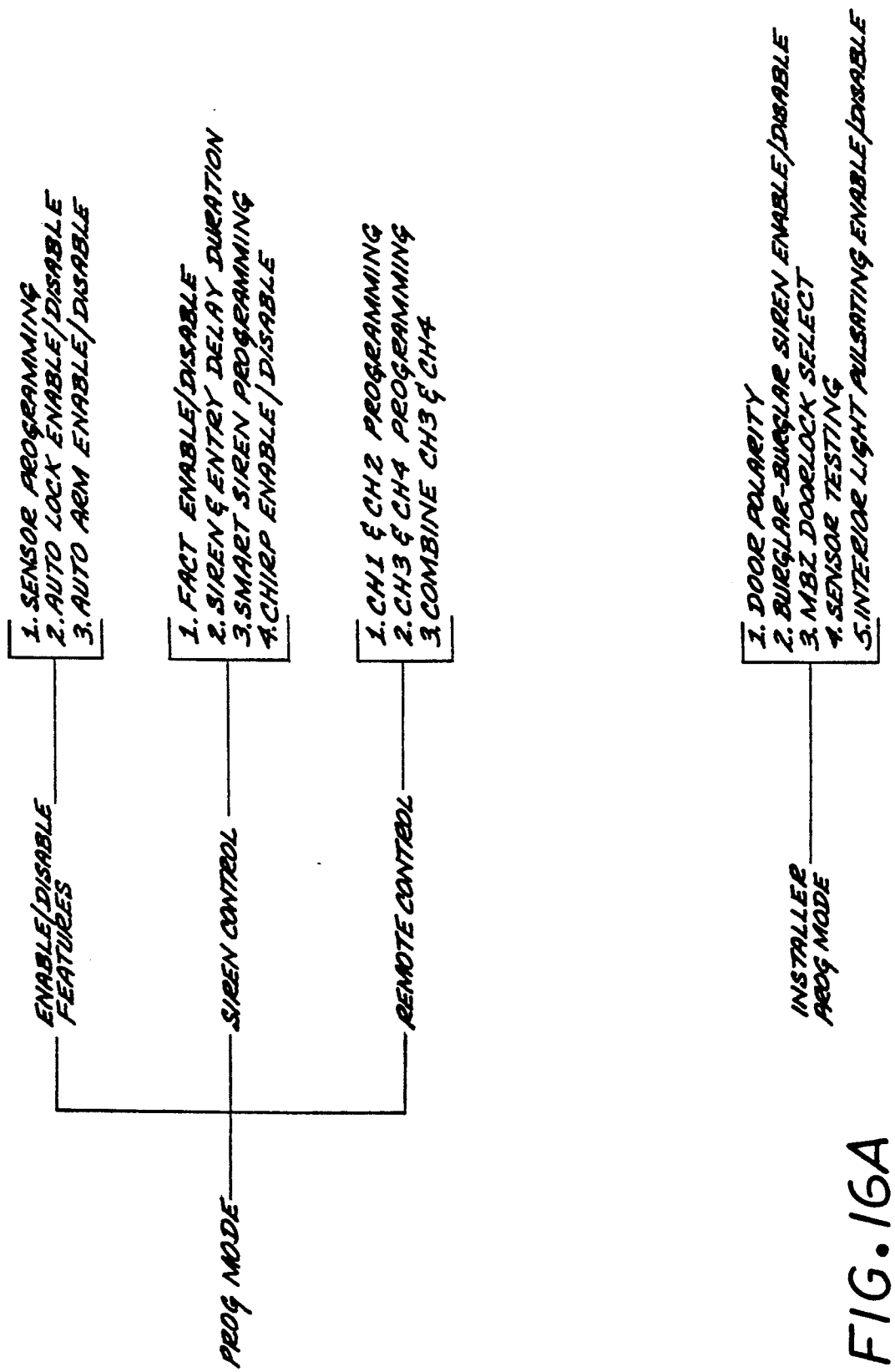
Figure 16B:
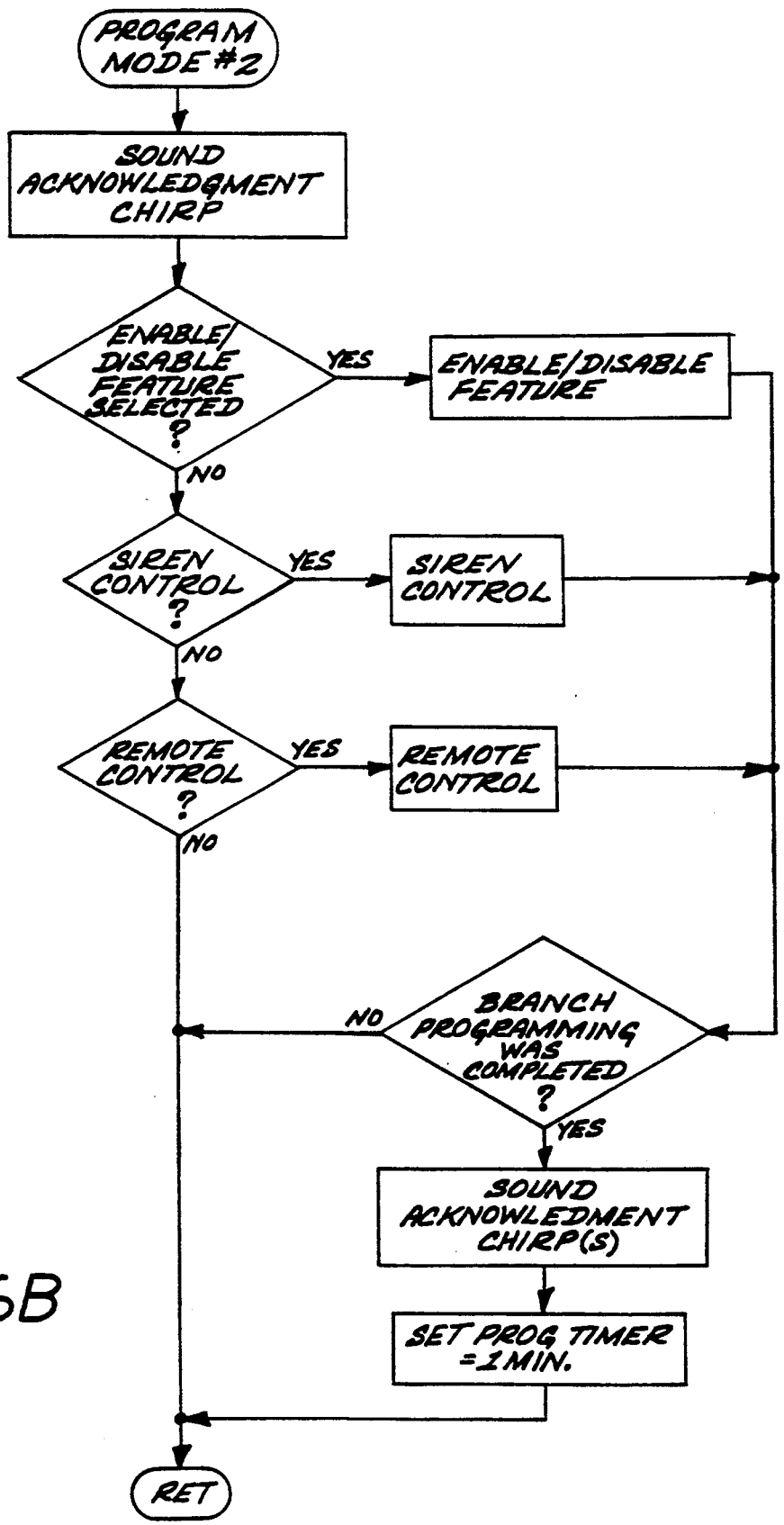

FIGS. 16A-F illustrate the PROGRAM MODE for the case of a multi-channel system with multiple feature programmability. As shown in FIG. 16A, there can be provided various programming options for selection by the user. A mean for selecting one of the programming options is described in the pending application Ser. No. 07/231,159, wherein the user may select one of the options by manipulating the program and valet switches after entering the programming mode. FIG. 16B shows a selection procedure for selecting the REMOTE CONTROL programming option as well as other options, and is described more fully in the pending application Ser. No. 07/231,159.

Figure 16C:
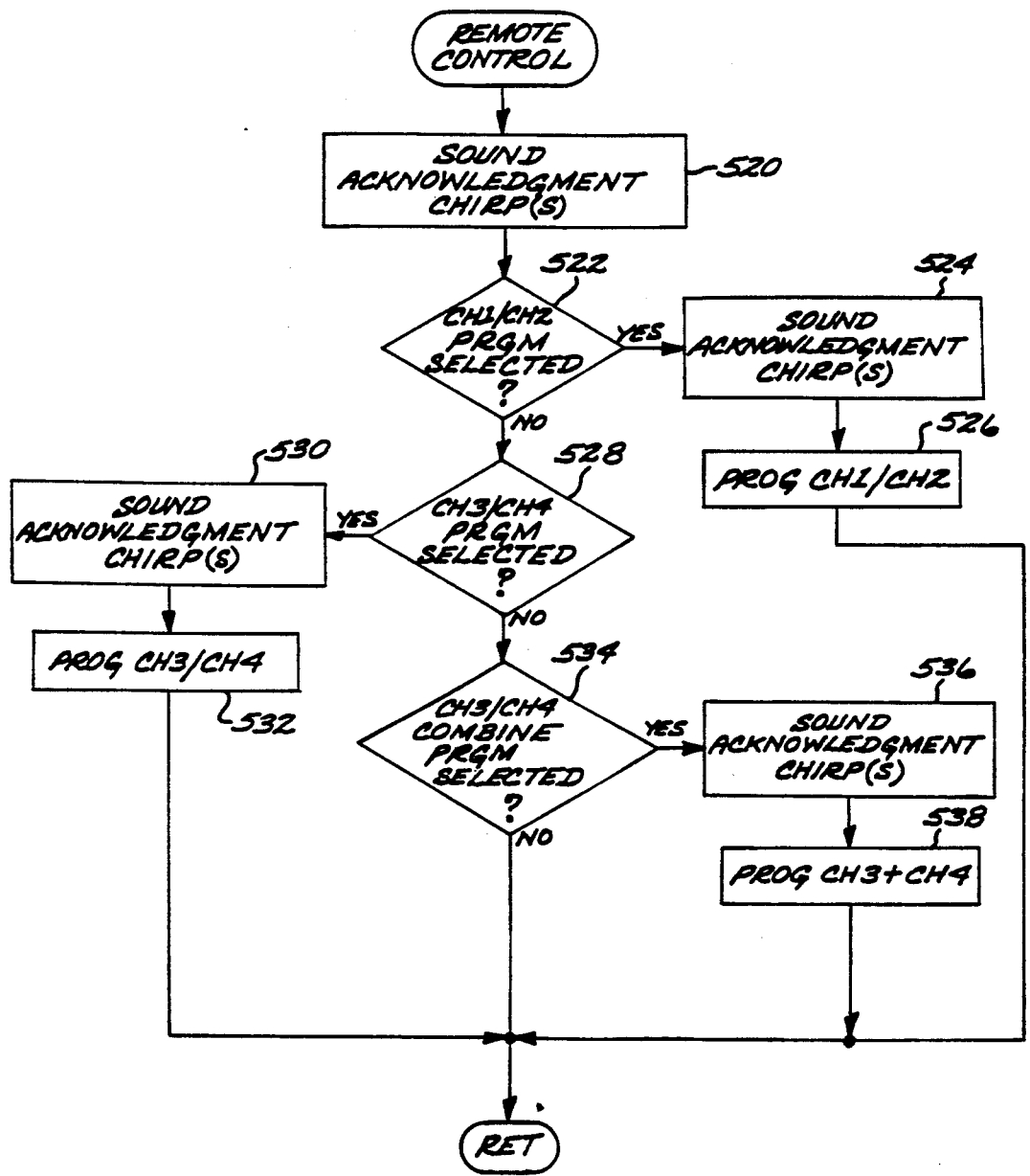

Assume that the user has now selected the REMOTE CONTROL option, so that the routine shown in FIG. 16C has been called. An appropriate number of acknowledgement chirps is sounded (step 520) to indicate that the remote control programming option has been selected and entered. At step 522, the determination is made as to whether the user has selected for programming channel 1/channel 2, and if so, a corresponding chirp message is sounded (step 524) and the PROG CH 1/CH2 subroutine is called. If the system has channels 3 and 4, then the CH3/CH4 subroutine may be selected (steps 528, 530 and 532). There may even be provided an option for combined programming of the channels 3 and 4, and this option may be selected also (steps 534, 536 and 538).

Figure 16D:
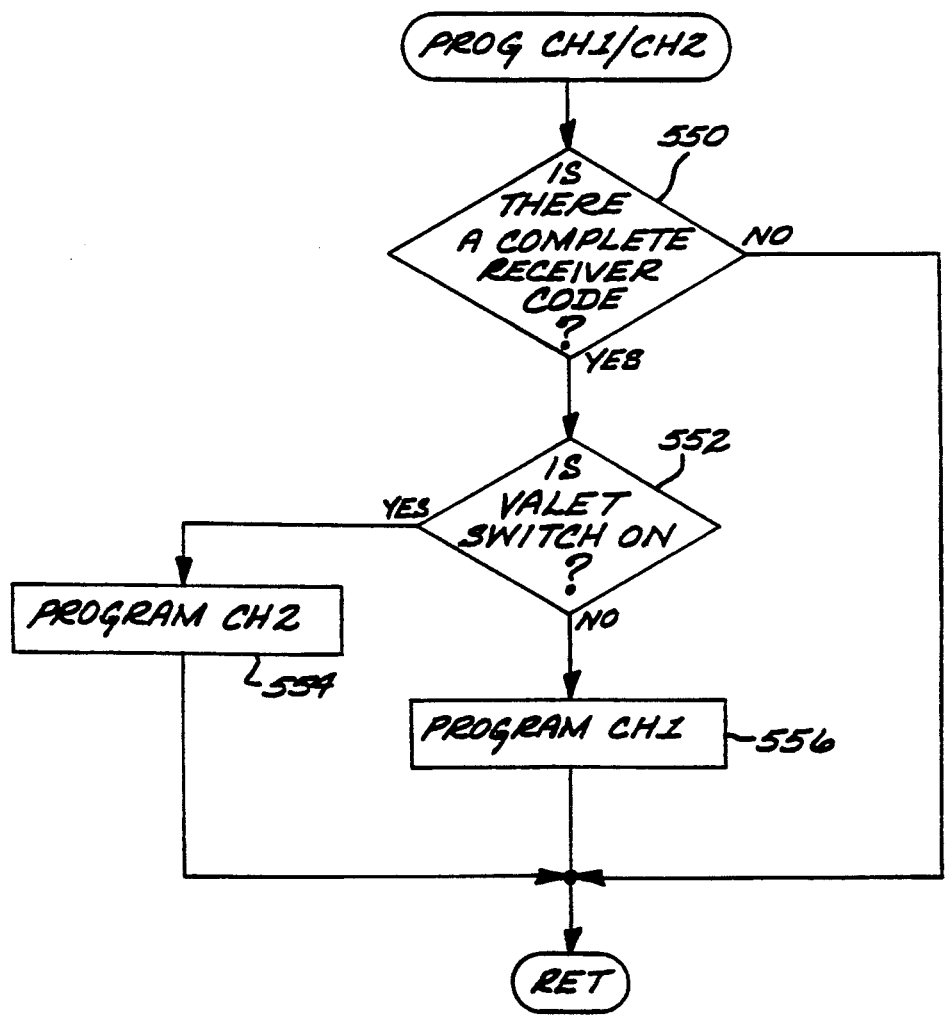

FIG. 16D shows the PROG CH1/CH2 subroutine, which selects either the channel 1 or channel 2 for programming. At step 550, if there has not been received, a complete code word operation returns to FIG. 16B. If a complete word has been received, then if the valet switch is on, channel 2 programming has been selected and the PROGRAM CH 2 subroutine is called (steps 552 and 554). If the valet switch is not on, then the channel 1 programming has been selected and the PROGRAM CH1 subroutine is called.

Figure 16E:
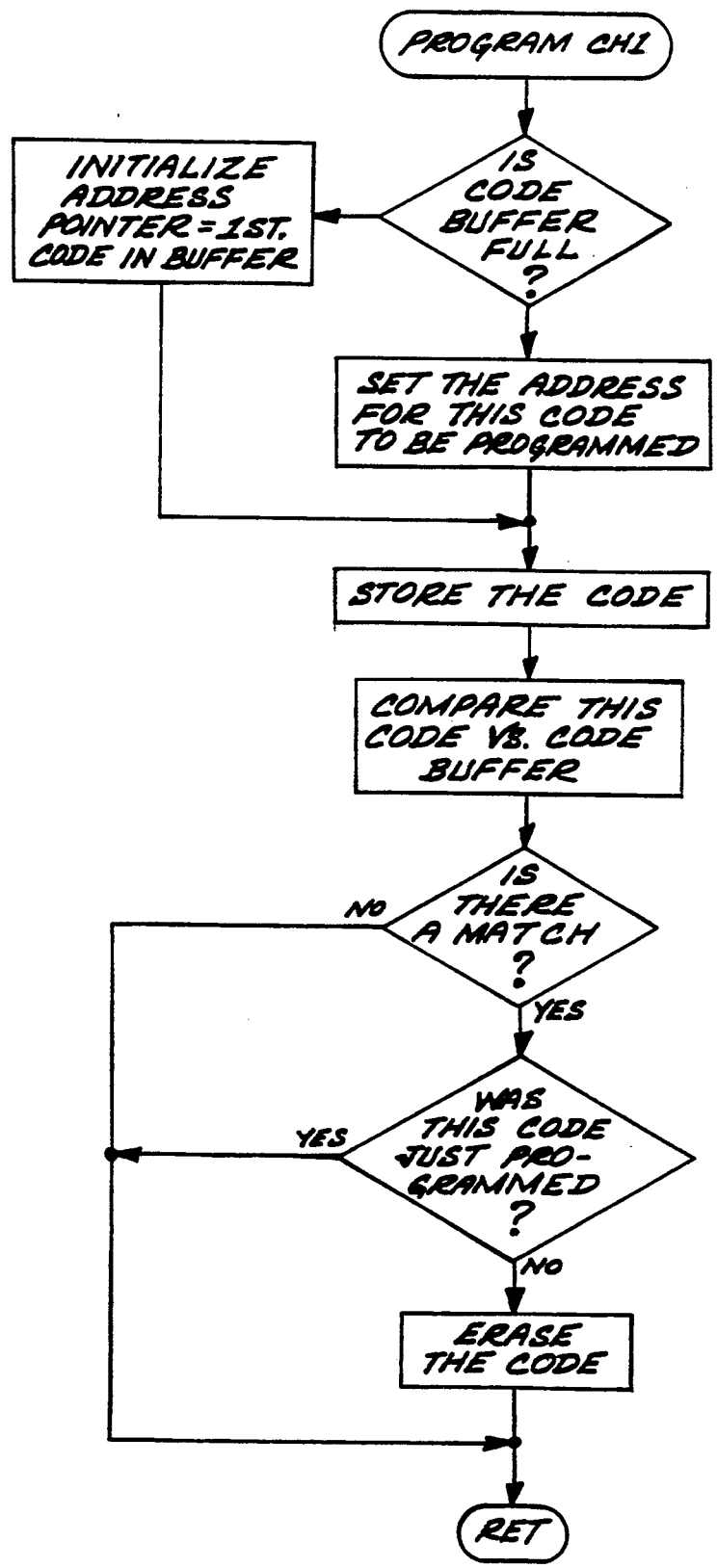
Figure 16F:
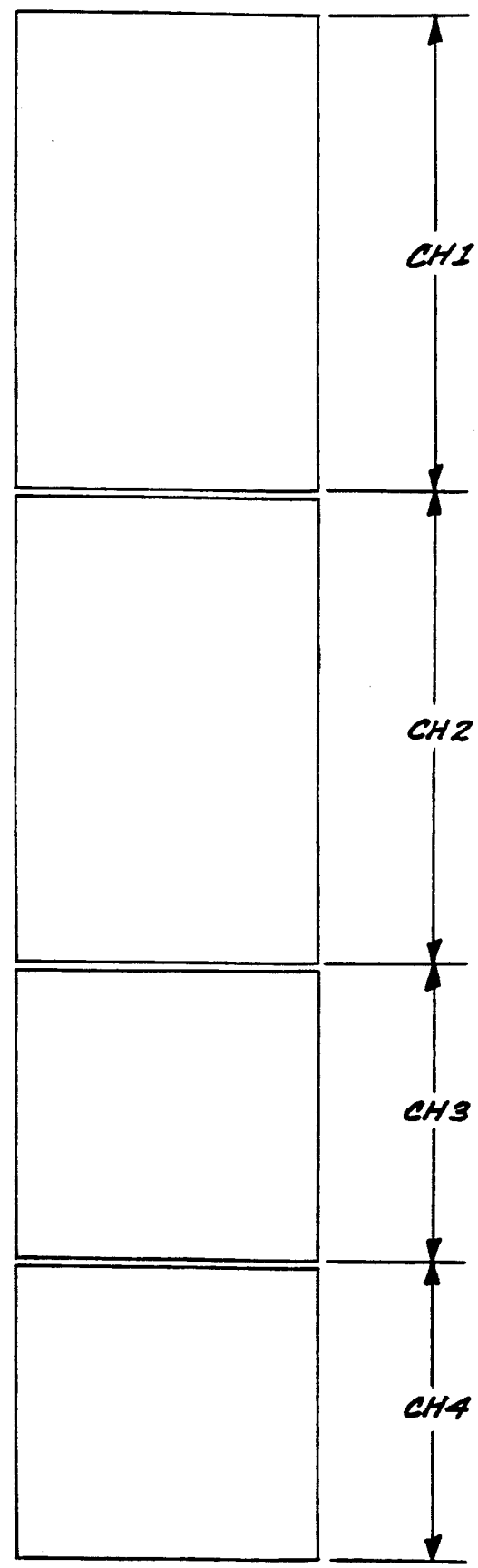

FIG. 16E illustrates the PROGRAM CH1 subroutine, which is very similar to the single channel program mode shown in FIG. 15. In this case, however, the allowable code addresses in which a new code word may be stored are those reserved for the channel 1 signature code words in the code buffer, as indicated in the simplified memory buffer map of FIG. 16F, showing respective memory locations for the respective exemplary channels 1-4. In comparing the new stored code word against the buffer contents for duplicate stored code words, however, all channel locations are searched, so that the same code word is not stored in more than one channel buffer. The PROGRAM CH2 subroutine is similar to the PROGRAM CH 1 routine, except that the allowable code addresses in which the channel 2 signature codes may be stored are those reserved for the channel 2 signature code words.

A selection routine may be employed for selecting between the channel 3 and channel 4 programming option similar to that shown in FIG. 16D for channels 1 and 2. Similarly, the PROGRAM CH3 and PROGRAM CH 4 subroutines are similar to the PROGRAM CH 1 subroutine described above.

Thus, a multi-channel system may be employed in which a predetermined number of code words may be stored in the memory of the control unit for enabling or disabling the various channels of the system. In this embodiment, the channel 1 codes are used to arm or disarm the security system. The remaining channels may be employed to enable or disable a desired function, e.g., a trunk release, a hood release, a power window function or the like.

OPERATION OF THE SYSTEM

The operation of the security system has been described in connection with the detailed description thereof. However, the following should provide a brief summary of the operation of the various embodiments of the system.

The transmitter unit 10 may be operated by actuation of the channel select and transmit switches for the transmitter embodiment of FIG. 1B, or one of the switches 54 or 56 for the transmitter embodiment of FIG. 3. The transmitter will thereupon generate a coded signal which is transmitted as an encoded radio frequency signal. The encoded transmitted signal is then received by the receiver 12, which will process the signal and generate an electrical signal output at the inverter 132. The signal from the inverter 132 is introduced into and decoded in the control unit 14.

When the user desires to match a transmitter 10 to the receiver control unit 14, the system will first be placed in the program mode. This may be accomplished, in the case of a single channel system, by actuating the program switch into a program position. (The switch may be activated manually or electronically or through voice recognition.) In a multi-channel system the user enters the program mode and selects the particular channel to which the transmitted signal is to be recorded. When the system is then in the program mode, a transmitter which is to have its signature code signal recorded therein is actuated to generate an encoded signal. This encoded signal will then be recorded as a signature code signal in the memory of the control unit 14. If only one transmitter is actuated while the control unit 14 is in the program mode, only a single signature code signal will be recorded in the control unit 14. If additional transmitters are actuated when the control unit 14 is in the program mode, each of those actuated transmitters will have its own signature code signal recorded. The control unit 14 will exit the program mode automatically after a preset duration where the control unit 14 is then in a condition to decode subsequent received encoded signals.

In the case of the multi-channel system, the user selects the particular channel into which the transmitter code is to be recorded, and thereafter the transmitter is actuated with the resulting received code being storing automatically in the memory buffer corresponding to the selected channel.

All subsequent signals will be compared against the recorded signature code signals. If any subsequent signal is identical to any of the signature code signals, then it will be recognized as a valid encoded signal and will thereupon arm or disarm the security system, in the case of a single channel system. However, if the subsequent signal does not conform to the signature code signals which have been recorded, then the subsequently transmitted and decoded signals will not arm or disarm the security system. In the multi-channel system, the control unit determines the corresponding channel of a valid received code and takes appropriate action in dependence on that channel. Thus, a channel 1 code will arm or disarm the system, a channel 2 code will activate the channel 2 output, and so on.

The transmitter may be capable of generating one or more individual encoded signals or channel codes, e.g., by actuation of the switches 54 and 56 in the transmitter embodiment of FIG. 3. Thus, either of the encoded signals from a single transmitter may be used to operate the control unit 14.

The user of the system can also easily delete one of the transmitters from the system by removing the signature code signal of that transmitter from the control unit. In this case, the signature code signal of the transmitter can be deleted from the system, depending upon the specific programming of the control unit 14. In one of the preferred embodiments, if the control unit 14 is placed in the program mode and the signature code signal is generated on a plurality of successive occasions, the number being equal to the number of code word locations assigned to storage of the signature code words, such as eight successive occasions in close sequence, that will cause an automatic deletion of the signature control signal and hence, that transmitter from the system. This results from the above-described program mode operation, wherein pre-existing stored rode words are successively erased once the particular channel buffer is full.

In accordance with the above-identified circuit arrangement, it can be understood that it is not necessary for the user or the dealer or the installer of the system to either understand or to have knowledge of the specific encoded signal which is generated in order to add or delete any transmitter from the remote control access system. Thus, the user does not have to actuate any predetermined number of switches or other input means, such as scratch a circuit pattern on a printed circuit board in order to generate the encoded signal. Indeed, the user or dealer or installer does not have to possess and use any of the special techniques for encoding the transmitter and which usually require the intervention of skilled personnel. Moreover, it is not even necessary for the user or the dealer or installer to open either the transmitter or the receiver in order to record the signature control signal.

When the security system in the program mode and when a signal is transmitted from any one or more transmitters, that signal will be received by the receiver 12 and decoded by the control unit 14. After decoding, the received signal will then be recorded in the memory of the control unit as a signature code signal. This will occur with each signal received from any transmitter when in the program mode. When the security system is in the operating-receive mode, no further recording can be accomplished until the system is switched back to the program mode. When in the operating-receive mode, if any encoded signal are generated and received by the receiver, they will be decoded and compared against the recorded signature code signals which have been recorded in the memory unit. If there is no valid comparison with any signature code signal, the received signal will be recognized as an invalid signal and will not arm or disarm the system.

Additional transmitters can be quickly and conveniently added to or deleted from the security system without the intervention of skilled personnel, such as a dealer or installer. The remote control vehicle security system is also highly effective in that it may be used with many transmitters and also many different types of transmitters and with transmitters operating on different coded bases. The use of the system with a plurality of differing types of transmitters is more fully illustrated in FIG. 2 of the drawings.

In this case, it can be observed that a first transmitter 10A comprising encoder 16A generates a first code A1. This transmitter 10A will generate a second code A2 if a pair of channels are provided on this transmitter. For this purpose, the transmitter shown in FIG. 1A or the circuit arrangement of FIG. 3 would be employed utilizing both switches 54 and 56. In like manner, a second transmitter device 10B comprising an encoder 16B is provided for purposes of generating a code B1 and an encoded signal B2. Finally, a third transmitter 10C comprising an encoder 16C is capable of generating a first encoded signal C1 and a second encoded signal C2. As also indicated previously, any of these transmitters could be used with more or less than two channel codes for generating any desired number of channel codes.

Figure 2:
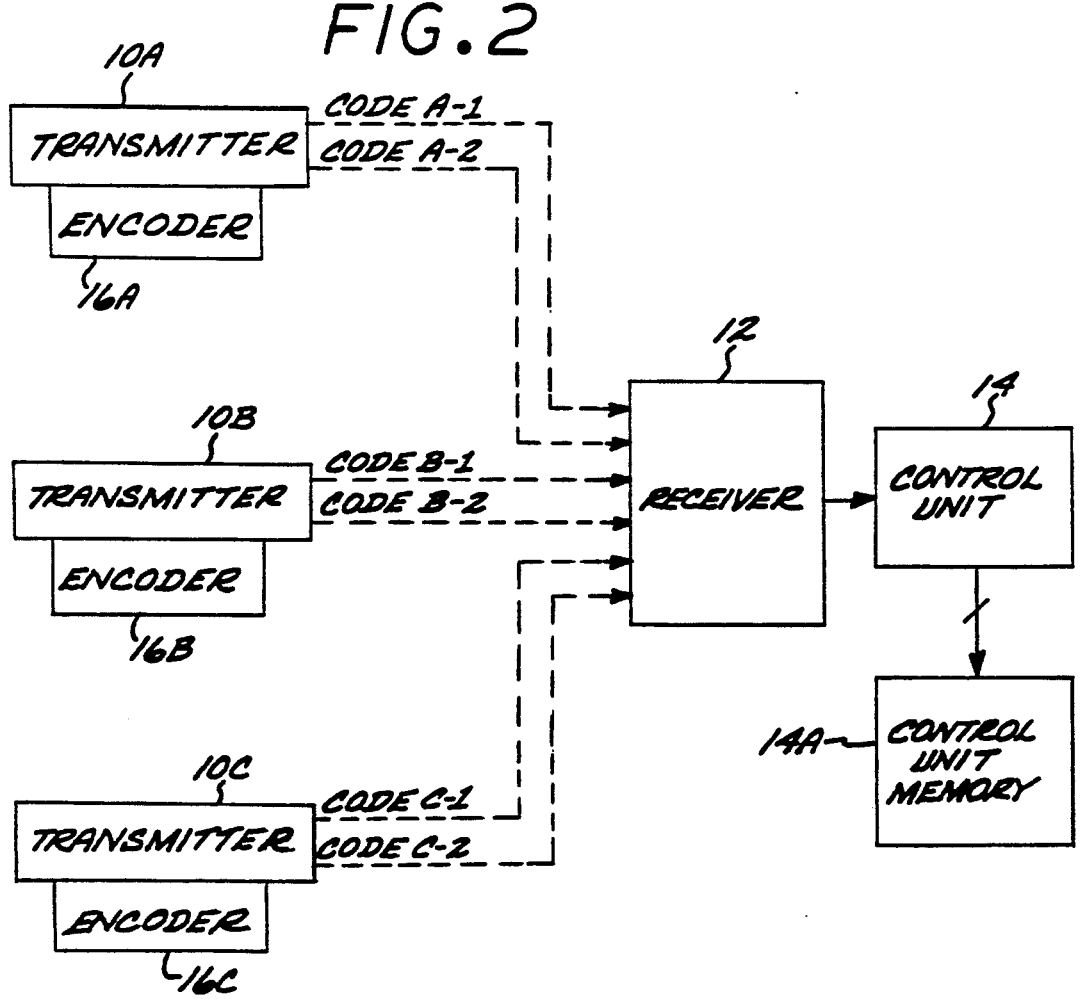
FIG. 2 is a block diagram of a multi-channel form of the remote control, vehicle security system embodying the present invention.

In accordance with the arrangement as illustrated in FIG. 2, it can be observed that each of these transmitters and encoders may be of different types and each will generate different encoding signals. Nevertheless, on the first occasion when each of these transmitters are used, they will be used in such manner so as to operate the control unit 14 to record a signature code signal. Thus, each of the three transmitters 10A, 10B and 10C will have their signature code signal recorded in the control unit. On each subsequent occasion, when they are actuated, they will be capable of arming and disarming the security system in the manner as previously described.

One of the unique aspects of this invention is the fact that any conventional transmitter can be used as long as it is operating on the same frequency as the receiver 12 and employs the same bit code format, such as pulse width modulation. Thus, if the user of the system loses one of the transmitters or desires to upgrade the system with another transmitter with more digital codes and higher security, it is not necessary to install an entirely new system. The user merely buys another transmitter and records the signature code signal in the microprocessor of the control unit 14.

Moreover, it is important to note that each transmitter is not required to generate the same encoded signal. Thus, the user may merely provide additional authorized parties wi&:h transmitters for obtaining access to the security system without an elaborate time consuming and costly recording of a particular transmitter. It is necessary to only record once the signature code signal of that transmitter in the control unit, as aforesaid In accordance with the present invention, it is also possible to simultaneously use any number of coded combinations, as for example, an M-bit, e.g., where M=14, encoded signal which could result in sixteen thousand encoded signal combinations. In like manner, it is possible to use an N-bit, e.g. where N=20, signal which could result in up to one million encoded signal combinations, etc. In essence, the system of the present invention is virtually unlimited to the number of codes which can be used or the number of bits in any encoded signal. The code memory reserves memory locations for a predetermined number of code words for each channel, e.g., eight possible signature code words for channel 1, but the bit length of each word is not preassigned. Thus, the signature code words may comprise different numbers of bits.

The system of the invention is also capable of comparing two or more sequential encoded, transmitted and decoded signals to ensure that they are identical to one another. Thereafter, if the subsequently decoded signals are identical, they are then compared to the signature code signals. If the decoded signals match the signature code signal, then it is deemed to be a valid transmitted signal for purposes of arming or disarming the security system be a valid transmitted signal for purposes of arming or disarming the security system.

Figure 6:
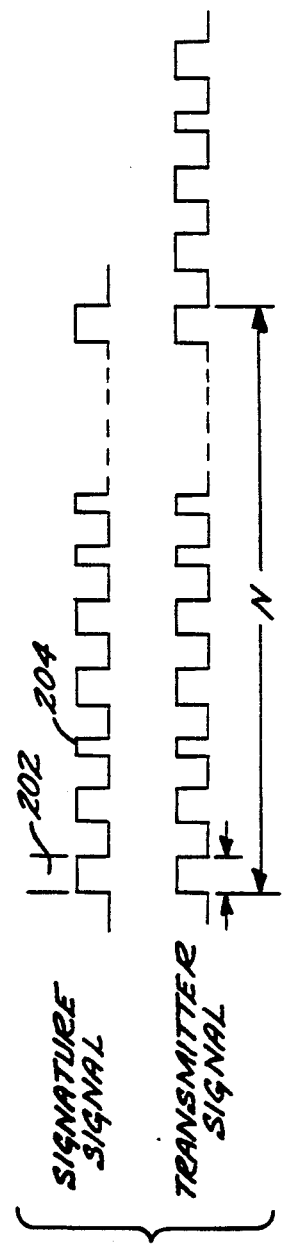
FIG. 6 is a timing diagram of a plurality of wave forms showing a transmitted encoded signal.

This arrangement for signal matching is more fully illustrated in FIG. 6 of the drawings. It can be observed that a signature code signal is shown in the upper portion of FIG. 6. The first of the bits, designated as 202 is a wider bit than another one of the bits 204 and, thus, the bit 202 may represent, for example, a "1" signal, whereas the bit 204 may represent a "0" signal. Located beneath the signature signal is the transmitted signal which may have been decoded in the control unit. In this case, it can be observed that the transmitted signal is identical to the signature signal.

The transmitted signal has length of n bit[, in the manner as illustrated in FIG. 6. Located to the right of the transmitted signal is a second transmitted signal. In this case, it can be observed that the second transmitted signal is shown to be duplicate of the first transmitted signal. In this way, the two transmitted and decoded signals will compare in the comparator of the control unit. As a result, they will form a signal combination which may be compared against the signature code signal. In this case, it can be observed that the two transmitted signals are identical and are also identical to the signature code signal. As a result, the microprocessor operated control unit will recognize this as a valid decoded signal, enabling the user to have access to the security system for purposes of arming or disarming the same.

If the second transmitted and decoded signal is not identical to the first transmitted signal, then there is no further comparison with respect to the signature control signal. There must be at least two or more sequential transmitted and decoded signals which are identical to one another before an comparison to the signature code signal can take place and hence, there must be the same comparison before any arming or disarming of the system can occur.

The microprocessor may also measure various other characteristics of the bits in order to determine whether or not a decoded signal is a valid signal. For example, the microprocessor could examine and compare bit length, the number of bits and widths of the bits. Other characteristics, for example, amplitude or the like could also be used for determining whether a decoded signal is a proper or valid decoded signal.

It is understood that the above-described embodiments are merely illustrative of the possible specific embodiments which may incorporate principles of the present invention. Other arrangements may readily be devised in accordance with these principles by those skilled in the art without departing from the scope of the invention.

What is claimed is:

1. An electronically programmable remote control vehicle security system, comprising:
   a precoded portable hand-held transmitter comprising means for generating and transmitting a predetermined fixed, digitally encoded, radio frequency, receiver-responsive signal representative of a predetermined fixed transmitter code, and actuating means for actuating said generating and transmitting means so that said signal is automatically generated and transmitted upon actuation;
   vehicle antitheft means;
   a system control unit disposed within said vehicle, comprising:
   (i) receiving means operable during a system program mode and a system operating-receiving mode for receiving said transmitted encoded signal and generating an electrical signal representative of the encoded signal;
   (ii) a digital memory for storing data representative of signature code signals;
   (iii) programming means for recording in said digital memory received signals for arming or disarming said vehicle antitheft means, said means activated only during said system program mode for automatically storing in said memory received signals representative of said predetermined transmitter code as a signature control signal for arming or disarming said vehicle antitheft means; further characterized in that said program mode is automatically terminated after a predetermined time delay from receipt of the last transmitted encoded signal during said program mode;

(iv) operating means activated during said operating-receiving mode for comparing received electrical signals with said signature control signal stored in said memory means to determine if said electrical signals correspond to said recorded signature code signal, and means for arming or disarming said vehicle antitheft means in response to received signals corresponding to said signature code signal stored in said memory; further characterized in that said system control unit comprises a user-accessible switch disposed in said vehicle, and said access control unit is responsive to the position of said switch for entering said program mode; and wherein said transmitter and said receiving means cooperate to form a one-way radio frequency signal transmission link for communicating signals only from said transmitter to said receiving means, said transmission link being employed by said system during said programming mode for transmitting said encoded signals from said transmitter to said access control unit to be stored in said memory as said code signals, said link further employed during said operating receiving mode for transmitting said encoded signals from said transmitter to said control unit.

2. An electronically programmable remote control vehicle security system, comprising:

a precoded portable hand-held transmitter comprising means for generating and transmitting a predetermined fixed, digitally encoded, radio frequency, receiver-responsive signal representative of a predetermined fixed transmitter code, and actuating means for actuating said generating and transmitting means so that said signal is automatically generated and transmitted upon actuation; wherein said transmitter is suitably encoded with said predetermined transmitter code by the manufacturer thereof so that the system user is not required to encode said transmitter;

vehicle antitheft means;

a system control unit disposed within said vehicle, comprising:

(i) receiving means operable during a system program mode and a system operating-receiving mode for receiving said transmitted encoded signal and generating an electrical signal representative of the encoded signal;

(ii) a digital memory for storing data representative of signature code signals;

(iii) programming means for recording in said digital memory received signals for arming or disarming said vehicle antitheft means, said means activated only during said system program mode for automatically storing in said memory received signals representative of said predetermined transmitter code as a signature control signal for arming or disarming said vehicle antitheft means;

(iv) operating means activated during said operating-receiving mode for comparing received electrical signals with said signature control signal stored in said memory means to determine if said electrical signals correspond to said recorded signature code signal, and means for arming or disarming said vehicle antitheft means in response to received signals corresponding to said signature code signal stored in said memory; and wherein said transmitter and said receiving means cooperate to form a one-way radio frequency signal transmission link for communicating signals only from said transmitter to said receiving means, said transmission link being employed by said system during said programming mode for transmitting said encoded signals from said transmitter to said access control unit to be stored in said memory as said code signals, said link further employed during said operating receiving mode for transmitting said encoded signals from said transmitter to said control unit.

3. An electronically programmable remote control vehicle security system, in which a receiver and a control unit therefor are operable upon receipt of a proper transmitted encoded signal from any of a plurality of transmitters to arm or disarm said vehicle security system, said system comprising:

at least one first transmitter capable of transmitting a first receiver responsive, radio frequency, digitally encoded signal comprising an N-bit digital code word for arming and disarming said system, said transmitter comprising actuating means for actuating said transmitting of said signal so that said first signal is automatically transmitted upon actuation;

at least one second transmitter capable of generating and transmitting a second receiver responsive, radio frequency, digitally encoded signal comprising an M-bit digital code word for arming and disarming said system, said second transmitter comprising actuating means for actuating said transmitting of said second signal so that said second signal is automatically transmitted upon actuation;

wherein N and M are each integer values and N need not equal M;

vehicle antitheft means;

a receiver located in said vehicle and responsive to the transmitted radio frequency encoded signals during a system programming mode and a system operating-receiving mode for generating electrical signals corresponding to each of the respectively encoded signals;

said receiver and said first and second transmitters comprising at least first and second one-way radio frequency signal transmission links for communicating signals only from said first or second transmitters to said receiver during said system programming and system operating-receiving modes; and a control unit operatively associated with the receiver, said control unit comprising:

(i) means for decoding said electrical signals to generate respective decoded digital signals representative of said N-bit code word and said M-bit code word;

(ii) a digital memory for storing said N and M-bit code words;

(iii) means operable in said system program mode for automatically recording in said digital memory said respective decoded digital signals received and decoded during said program mode as first and second signature code signals representative of said N-bit code word and said M-bit code word;

(iv) means activated during an operating-receiving mode for comparing received and decoded signals to said first and second signature code signals which have been previously recorded during said program mode to determine if said decoded digital signals correspond to either of the recorded signature code signals and thereby represent valid signals for arming or disarming said vehicle antitheft means; further characterized in that the system is user programmable such that the user of any transmitter may initially record the encoded signal from that transmitter as a signature code signal in the control unit by simple actuation of the transmitter when the system is in said program mode for recording signature control signals for arming or disarming said vehicle antitheft means, thereafter only requiring the transmission of the encoded signal from the transmitter for recording as a valid signature code signal, and whereby said signature control signal is automatically recorded in said digital memory; further characterized in that said system is provided with a switch disposed in said vehicle to put the receiver in the program mode for recording said arming/disarming signature control words; and further characterized in that said system program mode is automatically terminated after a pre-established time delay from receipt of the last transmitted encoded signal during said program mode.

4. An electronically programmable remote control vehicle security system, in which a receiver and a control unit therefore are operable upon receipt of a proper transmitted encoded signal from any of a plurality of transmitters to arm or disarm said vehicle security system, said system comprising:

at least one first transmitter capable of transmitting a first receiver responsive, radio frequency; digitally encoded signal comprising an N-bit digital code word for arming and disarming said system, said transmitter comprising actuating means for actuating said transmitting of said signal so that said first signal is automatically transmitted upon actuation;

at least one second transmitter capable of generating and transmitting a second receiver responsive, radio frequency, digitally encoded signal comprising an M-bit digital code word for arming and disarming said system, said second transmitter comprising actuating means for actuating said transmitting of said second signals so that said first signal is automatically transmitted upon actuation;

wherein N and M are each integer values and N need not equal M;

vehicle antitheft means;

a receiver located in said vehicle and responsive to the transmitted radio frequency encoded signals during a system programming mode and a system operating-receiving mode for generating electrical signals corresponding to each of the respectively encoded signals;

said receiver and said first and second transmitters comprising at least first and second one-way radio frequency signal transmission links for communicating signals only from said first or second transmitters to said receiver during said system programming and system operating-receiving modes; and a control unit operatively associated with the receiver, said control unit comprising:

(i) means for decoding said electrical signals to generate respective decoded digital signals representative of said N-bit code word and said M-bit code word;

(ii) a digital memory for storing said N and M-bit code words;

(iii) means operable in said system program mode for automatically recording in said digital memory said respective decoded digital signals received and decoded during said program mode as first and second signature code signals representative of said N-bit code word and said M-bit code word;

(iv) means activated during an operating-receiving mode for comparing received and decoded signals to said first and second signature code signals which have been previously recorded during said program mode to determine if said decoded digital signals correspond to either of the recorded signature code signals and thereby represent valid signals for arming or disarming said vehicle antitheft means; and wherein said first and second transmitters are respectively suitably encoded with said N-bit and said M-bit digital codes by the respective manufacturer thereof so that the system user is not required to encode said respective transmitters.

5. A vehicle security system in which a control unit is responsive to receipt of a proper transmitted encoded radio frequency signal from a transmitter to arm or disarm said system, comprising:

vehicle antitheft means, said means comprising a vehicle ignition disabling means;

a portable hand-held transmitter comprising means for generating and transmitting a predetermined fixed digitally encoded, radio frequency, receiver-responsive signal representative of a predetermined transmitter code; and a control unit located within said vehicle, comprising:

(i) radio frequency signal receiving means operable during said program mode and during said system operating-receiving mode for receiving said transmitted encoded signal and generating an electrical signal representative of the encoded signal;

(ii) a digital memory for storing signature code signals;

(iii) programming means for recording in said digital memory received signals for arming or disarming said vehicle antitheft means, said means activated only during a system program mode for automatically storing in said memory said electrical signals representative of said radio frequency, receiver-responsive received signals representative of said predetermined transmitter code as a signature code signal for arming or disarming said vehicle antitheft means; and (iv) operating means activated during an operating-receiving mode for comparing received electrical signals with said signature code signal stored in said memory means to determine if said electrical signals correspond to said recorded signature code signal and for arming or disarming said antitheft means if said electrical signals correspond to said recorded signature code signal, wherein said transmitter and said receiver means cooperate to form a one-way radio frequency signal transmission link for communicating signals only from said transmitter to said receiving means, said transmission link being employed by said system during said programming mode for transmitting said signal representative of said transmitter code to said access control unit to be stored in said memory means as signature code signals, said link further employed during said operating-receiving mode for transmitting said encoded signal from said transmitter to said access control unit; wherein said control unit is hidden from view within said vehicle at a relatively secure location not visible either from outside the vehicle or from passenger locations within the passenger compartment of said vehicle, and said system further comprises a switch accessible only within said vehicle for selective actuation by the system operator, said control unit being responsive to actuation of said switch for entering the program mode; and further characterized in that said program mode is automatically terminated after a predetermined time delay from receipt of the last transmitted encoded signal.

6. A vehicle security system in which a control unit is responsive to receipt of a proper transmitted encoded radio frequency signal from a transmitter to arm or disarm said system, comprising:

vehicle antitheft means, said means comprising a vehicle ignition disabling means;

a portable hand-held transmitter comprising means for generating and transmitting a predetermined fixed digitally encoded, radio frequency, receiver-responsive signal representative of a predetermined transmitter code; and wherein said predetermined transmitter code comprises a non-user-programmable N-bit digital code word;

a control unit located within said vehicle, comprising:

(i) radio frequency signal receiving means operable during said program mode and during said system operating-receiving mode for receiving said transmitted encoded signal and generating an electrical signal representative of the encoded signal;

(ii) a digital memory for storing signature code signals;

(iii) programming means for recording in said digital memory received signals for arming or disarming said vehicle antitheft means, said means activated only during a system program mode for automatically storing in said memory said electrical signals representative of said radio frequency, receiver-responsive received signals representative of said predetermined transmitter code as a signature code signal for arming or disarming said vehicle antitheft means; and (iv) operating means activated during an operating-receiving mode for comparing received electrical signals with said signature code signal stored in said memory means to determine if said electrical signals correspond to said recorded signature code signal and for arming or disarming said antitheft means if said electrical signals correspond to said recorded signature code signal, wherein said transmitter and said receiver means cooperate to form a one-way radio frequency signal transmission link for communicating signals only from said transmitter to said receiving means, said transmission link being employed by said system during said programming mode for transmitting said signal representative of said transmitter code to said access control unit to be stored in said memory means as signature code signals, said link further employed during said operating-receiving mode for transmitting said encoded signal from said transmitter to said access control unit.

7. A vehicle security system in which a control unit is responsive to receipt of a proper transmitted encoded radio frequency signal from a transmitter to arm or disarm said system, comprising:

vehicle antitheft means, said means comprising a vehicle ignition disabling means;

a portable hand-held transmitter comprising means for generating and transmitting a predetermined fixed digitally encoded, radio frequency, receiver-responsive signal representative of a predetermined transmitter code;

a control unit located within said vehicle, comprising:

(i) radio frequency signal receiving means operable during said program mode and during said system operating-receiving mode for receiving said transmitted encoded signal and generating an electrical signal representative of the encoded signal;

(ii) a digital memory for storing signature code signals;

(iii) programming means for recording in said digital memory received signals for arming or disarming said vehicle antitheft means, said means activated only during a system program mode for automatically storing in said memory said electrical signals representative of said radio frequency, receiver-responsive received signals representative of said predetermined transmitter code as a signature code signal for arming or disarming said vehicle antitheft means; and (iv) operating means activated during an operating-receiving mode for comparing received electrical signals with said signature code signal stored in said memory means to determine if said electrical signals correspond to said recorded signature code signal and for arming or disarming said antitheft means if said electrical signals correspond to said recorded signature code signal, wherein said transmitter and said receiver means cooperate to form a one-way radio frequency signal transmission link for communicating signals only from said transmitter to said receiving means, said transmission link being employed by said system during said programming mode for transmitting said signal representative of said transmitter code to said access control unit to be stored in said memory means as signature code signals, said link further employed during said operating-receiving mode for transmitting said encoded signal from said transmitter to said access control unit; further characterized in that said access control unit is operable in the program mode to automatically record a plurality of different transmitter codes from a plurality of different transmitters codes and wherein said control unit is responsive to received signals corresponding to any one of said stored transmitter codes for arming or disarming the vehicle antitheft means; and wherein said transmitter is suitably encoded with said transmitter code by the manufacturer thereof so that the system user is not required to encode said transmitter.

8. A vehicle security system in which a control unit is responsive to receipt of a proper transmitted encoded radio frequency signal from a transmitter to arm or disarm said system, comprising:

vehicle antitheft means, said means comprising a vehicle ignition disabling means;

a portable hand-held transmitter comprising means for generating and transmitting a predetermined fixed digitally encoded, radio frequency, receiver-responsive signal representative of a predetermined transmitter code;

a control unit located within said vehicle, comprising:
(i) radio frequency signal receiving means operable during said program mode and during said system operating-receiving mode for receiving said transmitted encoded signal and generating an electrical signal representative of the encoded signal;
(ii) a digital memory for storing signature code signals;
(iii) programming means for recording in said digital memory received signals for arming or disarming said vehicle antitheft means, said means activated only during a system program mode for automatically storing in said memory said electrical signals representative of said radio frequency, receiver-responsive received signals representative of said predetermined transmitter code as a signature code signal for arming or disarming said vehicle antitheft means; and
(iv) operating means activated during in operating-receiving mode for comparing received electrical signals with said signature code signal stored in said memory means to determine if said electrical signals correspond to said recorded signature code signal and for arming or disarming said antitheft means if said electrical signals correspond to said recorded signature code signal, wherein said transmitter and said receiver means cooperate to form a one-way radio frequency signal transmission link for communicating signals only from said transmitter to said receiving means, said transmission link being employed by said system during said programming mode for transmitting said signal representative of said transmitter code to said access control unit to be stored in said memory means as signature code signals, said link further employed during said operating-receiving mode for transmitting said encoded signal from said transmitter to said access control unit; and wherein said control unit is operable in the program mode to record a plurality of different transmitter encoded signals of different code bit lengths as valid signature code words, and operable in the operating-receive mode to decode and compare said decoded signals of different bit lengths to each of said recorded signature code signals.

9. A vehicle security system in which a control unit is responsive to receipt of a proper transmitted encoded radio frequency signal from a transmitter to arm or disarm said system, comprising:

vehicle antitheft means, said means comprising a vehicle ignition disabling means;

a portable hand-held transmitter comprising means for generating and transmitting a predetermined fixed digitally encoded, radio frequency, receiver-responsive signal representative of a predetermined transmitter code;

a control unit located within said vehicle, comprising:
(i) radio frequency signal receiving means operable during said program mode and during said system operating-receiving mode for receiving said transmitted encoded signal and generating an electrical signal representative of the encoded signal;
(ii) a digital memory for storing signature code signals;
(iii) programming means for recording in said digital memory received signals for arming or disarming said vehicle antitheft means, said means activated only during a system program mode for automatically storing in said memory said electrical signals representative of said radio frequency, receiver-responsive received signals representative of said predetermined transmitter code as a signature code signal for arming or disarming said vehicle antitheft means, and
(iv) operating means activated during an operating-receiving mode for comparing received electrical signals with said signature code signal stored in said memory means to determine if said electrical signals correspond to said recorded signature code signals and for arming or disarming said antitheft means if said electrical signals correspond it said recorded signature code signal, wherein said transmitter and said receiver means cooperate to form a one-way radio frequency signal transmission link for communicating signals only from said transmitter to said receiving means, said transmission link being employed by said system during said programming mode for transmitting said signal representative of said transmitter code to said access control unit to be stored in said memory means as signature code signals, said link further employed during said operating-receiving mode for transmitting said encoded signal from said transmitter to said access control unit; and wherein said transmitter comprises means for selectively generating and transmitting either a first or a second predetermined digitally encoded, radio frequency signal representative of first or second predetermined transmitter codes, said control unit is operable in the program mode to record respective signals representative of said first or second transmitter codes, and wherein said operating means comprises means for arming or disarming said antitheft means in response to receipt of signals corresponding to said first code, and means for performing a second predetermined function in response to signals corresponding to said second transmitter code.

10. An electronically programmable remote control vehicle security system, comprising:

a multi-channel remote control transmitter comprising means for generating a plurality of predetermined digitally encoded, radio frequency, signals representative of a plurality of predetermined transmitter channel signature codes, and user-activated means for selecting and transmitting respective ones of said signals;

vehicle antitheft means;

a system control unit disposed within said vehicle, comprising:

(i) receiving means operable during a system program mode and a system operating-receiving mode for receiving said transmitted encoded signal and generating an electrical signal representative of the encoded signal;

(ii) a digital memory for storing data representative of signature code signals, said memory comprising a plurality of assigned memory locations for storing signature code signals for each of said channels;

(iii) programming means activated only during said system program mode for selecting a particular channel and storing in an assigned memory location in said memory received signals representative of said predetermined transmitter channel code as a signature channel control signal;

(iv) operating means activated during said operating-receiving mode for comparing received electrical signals with said signature control signals stored in said memory means to determine if said electrical signals correspond to said recorded signature code signal, means for determining the channel having a corresponding signature channel control signal stored therein, and responsive action means for the respective identified channel activated upon receipt of a matching channel signature code;

wherein said transmitter and said receiving means cooperate to form a one-way radio frequency signal transmission link for communicating signals only from said transmitter to said receiving means, said transmission link being employed by said system during said programming mode for transmitting said encoded signals from said transmitter to said access control unit to be stored in said memory as said code signals, said link further employed during said operating receiving mode for transmitting said encoded signals from said transmitter to said control unit; and wherein said transmitter is suitably encoded with said predetermined transmitter code by the manufacturer thereof so that the system user is not required to encode said transmitter.

* * * * *

(12) EX PARTE REEXAMINATION CERTIFICATE (7100th)
United States Patent
Drori

(10) Number: US 5,146,215 C1
(45) Certificate Issued: Oct. 13, 2009

(54) ELECTRONICALLY PROGRAMMABLE REMOTE CONTROL FOR VEHICLE SECURITY SYSTEM

(75) Inventor: Ze'ev Drori, Chatsworth, CA (US)

(73) Assignee: Canadian Imperial Bank of Commerce, New York, NY (US)

Reexamination Request:
No. 90/009,115, Apr. 21, 2008

Reexamination Certificate for:
Patent No.: 5,146,215
Issued: Sep. 8, 1992
Appl. No.: 07/277,959
Filed: Nov. 30, 1988

Related U.S. Application Data

(63) Continuation-in-part of application No. 07/231,159, filed on Aug. 11, 1988, now Pat. No. 4,922,224, application No. 90/009,115, which is a continuation-in-part of application No. 07/094,395, filed on Sep. 8, 1987, now abandoned.

(51) Int. Cl.
*G07C 9/00* (2006.01)
*B60R 25/10* (2006.01)
*G09B 29/04* (2006.01)
*G08B 29/00* (2006.01)

(52) U.S. Cl. ............ 340/5.22; 340/5.3; 340/5.64; 340/825.69; 340/825.72

(58) Field of Classification Search ............ None
See application file for complete search history.

(56) References Cited

U.S. PATENT DOCUMENTS

| 4,881,148 A | * | 11/1989 | Lambropoulos et al. ..... 361/172 |
| 5,109,221 A | * | 4/1992 | Lambropoulos et al. ... 340/5.22 |
| 5,252,966 A | * | 10/1993 | Lambropoulos et al. ... 340/5.64 |
| 5,406,274 A | * | 4/1995 | Lambropoulos et al. ...... 340/825.69 |
| 5,619,191 A | * | 4/1997 | Lambropoulos et al. ... 340/5.22 |
| 5,774,064 A | * | 6/1998 | Lambropoulos et al. ...... 340/825.69 |

* cited by examiner

*Primary Examiner*—Deandra M Hughes

(57) ABSTRACT

An electronically programmable remote control for an vehicle security system. The system remote control comprises one or more hand-held remote transmitters and a receiver unit located in the vehicle. The receiver is operable in conjunction with a control unit which contains a microprocessor capable of performing control functions and encoding functions. The remote control enables the user to electronically program into or delete from the receiver a digital code from any of a plurality of transmitters. It is not necessary for the user or anyone else to know the specific encoded signal which is transmitted from any of the transmitters to the receiver. The receiver is operable with a plurality of transmitters, all of which operate on the same frequency.

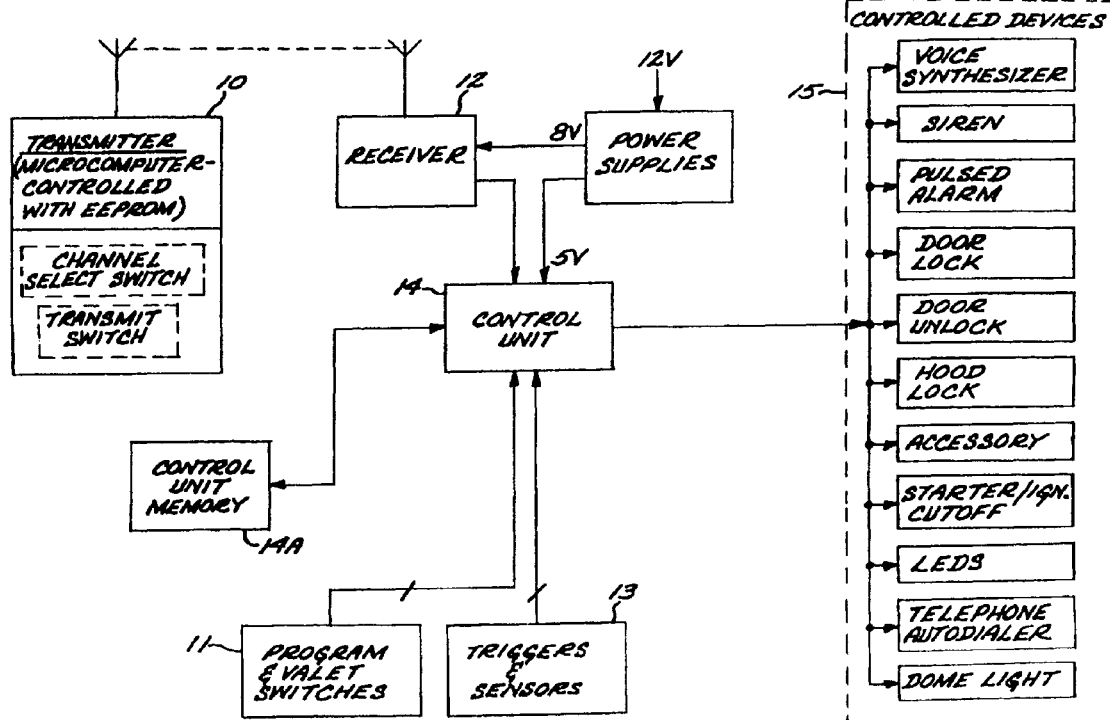

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *